United States Patent [19]
Matsuo et al.

[11] Patent Number: 6,083,860
[45] Date of Patent: Jul. 4, 2000

[54] METHOD AND COMPOSITION FOR FORMING CERAMICS AND ARTICLE COATED WITH THE CERAMICS

[75] Inventors: Hideki Matsuo; Masahiro Kokubo; Takashi Ohbayashi; Yuji Tashiro; Tadashi Suzuki; Masami Kizaki; Haruo Hashimoto; Yasuo Shimizu, all of Saitama; Takaaki Sakurai; Hiroyuki Aoki, both of Tokyo, all of Japan

[73] Assignee: Tonen Corporation, Tokyo, Japan

[21] Appl. No.: 09/005,925

[22] Filed: Jan. 12, 1998

Related U.S. Application Data

[63] Continuation of application No. 08/543,157, Oct. 13, 1995, Pat. No. 5,747,623.

[30] Foreign Application Priority Data

Oct. 14, 1994 [JP] Japan .................................. 6-249374
Dec. 16, 1994 [JP] Japan .................................. 6-313425

[51] Int. Cl.[7] .................................................. C04B 35/56
[52] U.S. Cl. .......................... 501/92; 528/14; 528/15; 528/18; 528/34; 528/486; 528/490; 528/499; 528/503; 525/474; 525/477
[58] Field of Search ........................... 528/15, 14, 18, 528/34, 486, 490, 499, 503; 525/477, 474; 501/92

[56] References Cited

U.S. PATENT DOCUMENTS 5,747,623 5/1998 Matsuo et al. ......................... 525/474

Primary Examiner—Melvyn I. Marquis
Attorney, Agent, or Firm—Eugene Lieberstein; Michael M. Meller

[57] ABSTRACT

A method for forming dense ceramics, particularly a ceramic coating by a low temperature treatment is provided. The method for forming ceramics according to the invention is characterized in that a polysilazane having a number-average molecular weight of 100 to 50,000 or a modified polysilazane thereof is subjected to a heat treatment, then exposed to an atmosphere containing water vapor or immersed in distilled water containing a catalyst, or both, or is brought into contact with $Pd^{2+}$ ions and water, the polysilazane having a skeleton comprising the unit represented by the following general formula (I):

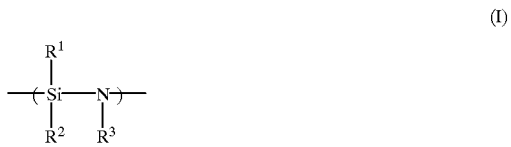

wherein $R^1$, $R^2$ and $R^3$ each independently represents a hydrogen atom, an alkyl group, an alkenyl group, a cycloalkyl group, an aryl group, a group other than the above and having a carbon atom directly attached to the silicon atom, an alkylsilyl group, an alkylamino group and an alkoxy group; with the proviso that at least one of $R^1$, $R^2$ and $R^3$ is a hydrogen atom. A method wherein said modified polysilazane is only fired at a temperature of 400° C. or below is also provided.

29 Claims, 10 Drawing Sheets

METHOD AND COMPOSITION FOR FORMING CERAMICS AND ARTICLE COATED WITH THE CERAMICS

This is a continuation of appliction Ser. No. 08/543,157, filed Oct. 13, 1995, now U.S. Pat. No. 5,747,623.

BACKGROUND OF THE INVENTION

1. Field of the Invention

The present invention relates to a method for forming ceramics, particularly ceramic coatings, having excellent properties such as heat resistance, abrasion resistance, gas barrier properties and corrosion resistance, at low temperature, by utilizing a polysilazane as an essential component. Further, it relates to a composition for forming such ceramic coatings at low temperature, and to an article which cannot be subjected to high temperature coated with $SiO_2$ derived from a polysilazane by a method of the invention.

2. Description of Related Art

For properties such as high abrasion resistance, corrosion resistance, heat resistance and impermeability to water vapor, Na, and the like, organic paints are inadequate and ceramics based coatings are used.

Prior arts for forming ceramic coatings include PVD (e.g. sputtering), CVD, sol-gel process, polytitanocarbosilane paints, poly-(disil)silazane paints, polysilazane paints, polymetalosilazane paints, and the like.

These ceramic coatings have drawbacks. Specifically, PVD and CVD processes require expensive devices. In sol-gel process, firing temperatures of 500° C. or higher are needed. Polytitanocarbosilane paints have insufficient surface strength when fired at low temperature (400° C. or below). Poly(disil)silazane polymer is difficult to apply and is liable to yield cracks. Polysilazane and polymetalosilazane may be fired at a temperature of 200 to 500° C. into coatings, but firing at a temperature below 300° C. may lead to unacceptable coating quality.

Methods for coating surfaces are disclosed to provide plastic films with gas-barrier properties, hardness and heat resistance without impairing transparency of the film. For example, Japanese Unexamined Patent Publication (Kokai) No. 4-80030/1992 discloses a method for forming a combined inorganic/organic coating on a surface by coating a solution of alkoxysilane using a sol-gel process. Japanese Unexamined Patent Publication (Kokai) No. 6-93120/1994 discloses a method for forming $SiO_2$ coatings on a base film having high gas barrier properties by a dry plating process such as vacuum deposition, ion plating and sputtering.

The above method as in Japanese Unexamined Patent Publication (Kokai) No. 4-80030/1992, however, requires a high temperature in forming coatings which limits the types of usable bases, results in low density coatings, and produces coatings having insufficient mechanical strength. Also, coatings prepared by the above method as in Japanese Unexamined Patent Publication (Kokai) No. 6-93120/1994, are expensive, have insufficient gas barrier properties, and suffer from cracks when producing a thick coating.

Accordingly, the main object of the present invention is to solve the above-mentioned problems in the prior art and provide a method for forming a ceramic coating which has good heat resistance, abrasion resistance, gas barrier properties and corrosion resistance, and is dense without cracks, by firing at low temperature. Particularly, by utilizing the characteristic low temperature firing, the specific purpose of the present invention is to make it possible to coat materials having low heat resistance such as electronic parts, for example, glass substrates for liquid crystals, color filters, printed circuit boards, IC and LSI boards; plastic products, for example, plastic films, resin glass, plastic plates and vinyl chloride pipes; wooden products; paper products; products plated with gold, silver, and the like; which materials cannot be coated by methods of the prior art; and semiconductor base materials (including silicon boards with wiring).

SUMMARY OF THE INVENTION

The inventors have carried out intensive and extensive investigations in order to solve the above-mentioned problems, and have found that, as one aspect of the invention, improved ceramics, specifically ceramic coatings may be formed at a lower temperature than ever by a method wherein a polysilazane or a composition comprising a polysilazane is subjected to heat treatment at a temperature of 150° C. or below, then exposed to an atmosphere containing water vapor or immersed in distilled water containing a catalyst, or both.

Thus, in accordance with the present invention, a method for forming ceramics is provided characterized in that a polysilazane having a number-average molecular weight of 100 to 50,000 or a modified polysilazane thereof is subjected to a drying treatment at room temperature or a heat treatment in the ambient atmosphere or an inert gas atmosphere, then exposed to an atmosphere containing water vapor or immersed in distilled water containing a catalyst, or both, said polysilazane having a skeleton comprising the unit represented by the following general formula (I):

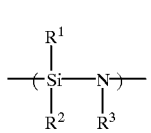

(I)

wherein $R^1$, $R^2$ and $R^3$ each independently represents a hydrogon atom, an alkyl group, an alkenyl group, a cycloalkyl group, an aryl group, a group other than the above and having a carbon atom directly attached to the silicon atom, an alkylsilyl group, an alkylamino group, and an alkoxy group; with the proviso that at least one of $R^1$, $R^2$ and $R^3$ is a hydrogen atom.

Also, according to another aspect of the invention, a method for forming ceramics is provided characterized in that a polysilazane having a number-average molecular weight of 100 to 50,000 and having a skeleton comprising the unit represented by the above general formula (I) is brought into contact with $Pd^{2+}$ ions and water.

In accordance with still another aspect of the invention, a method for forming ceramics is provided characterized in that a modified product of a polysilazane having a number-average molecular weight of 100 to 50,000 and having a skeleton comprising the unit represented by the above general formula (I) is subjected to a heat treatment at a temperature of 400° C. or below in the ambient atmosphere or an inert gas atmosphere.

The present invention also provides $SiO_2$-coated articles comprising an $SiO_2$ coating having a nitrogen content of 0.05 to 5 atom % formed by making a polysilazarie into ceramics according to said method.

The present invention also provides a composition which may be converted into ceramics at low temperature comprising a metal carboxylate-added polysilazane having a weight ratio of metal carboxylate to polysilazane ranging form 0.000001 to 2 and a number-average molecular weight of about 200 to 500,000, obtained by reacting a metal carboxylate comprising at least one metal selected from the group consisting of nickel, titanium, platinum, rhodium, cobalt, iron, ruthenium, osmium, palladium, iridium and aluminum, with a polysilazane having a number average molecular weight of 100 to 50,000 and having a skeleton comprising the unit represented by the following general formula (I):

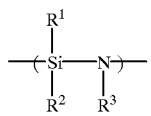

(I)

wherein $R^1$, $R^2$ and $R^3$ each independently represents a hydrogen atom, an alkyl group, an alkenyl group, a cycloalknyl group, an aryl group, a group other than the above and having a carbon atom directly attached to tile silicon atom, an alkylsilyl group, an alkylamino group and an alkoxy group; with the proviso that at least one of $R^1$, $R^2$ and $R^3$ is a hydrogen atom.

The present invention also provides a composition which may be converted into ceramics at low temperature comprising an acetylacetonato complex-added polysilazane having a weight ratio of acetylacetonato complex to polysilazane ranging from 0.000001 to 2 and a number-average molecular weight of about 200 to 500,000, obtained by reacting a polysilazane having a number-average molecular weight of 100 to 50,000 and having a skeleton comprising the unit represented by the above general formula (I) with an acetylacetorlato complex comprising as a metal nickel, platinum, palladium or aluminum.

The present invention further provides a composition which may be converted into ceramics at low temperature, obtained by adding fine particles of at least one metal selected from the group consisting of Au, Ag, Pd and Ni into a coating solution containing as a major component a polysilazane having a number-average molecular weight of 100 to 50,000 and having a skeleton comprising the unit represented by the above general formula (I).

In accordance with the present invention, ceramics, particularly ceramic coatings, are formed by treatment at temperatures unexpectedly low in the art, thus the present invention has made it possible to coat materials having low heat resistance such as electronic parts, for example, glass substrates for a liquid crystal, color filters, printed circuit boards, IC and LSI boards; plastic products, for example, plastic films, resin glass, plastic plates and vinyl chloride pipes; wooden products; paper products; products plated with gold, silver, and the like.

DESCRIPTION OF THE PREFERRED EMBODIMENT

Figure 1:
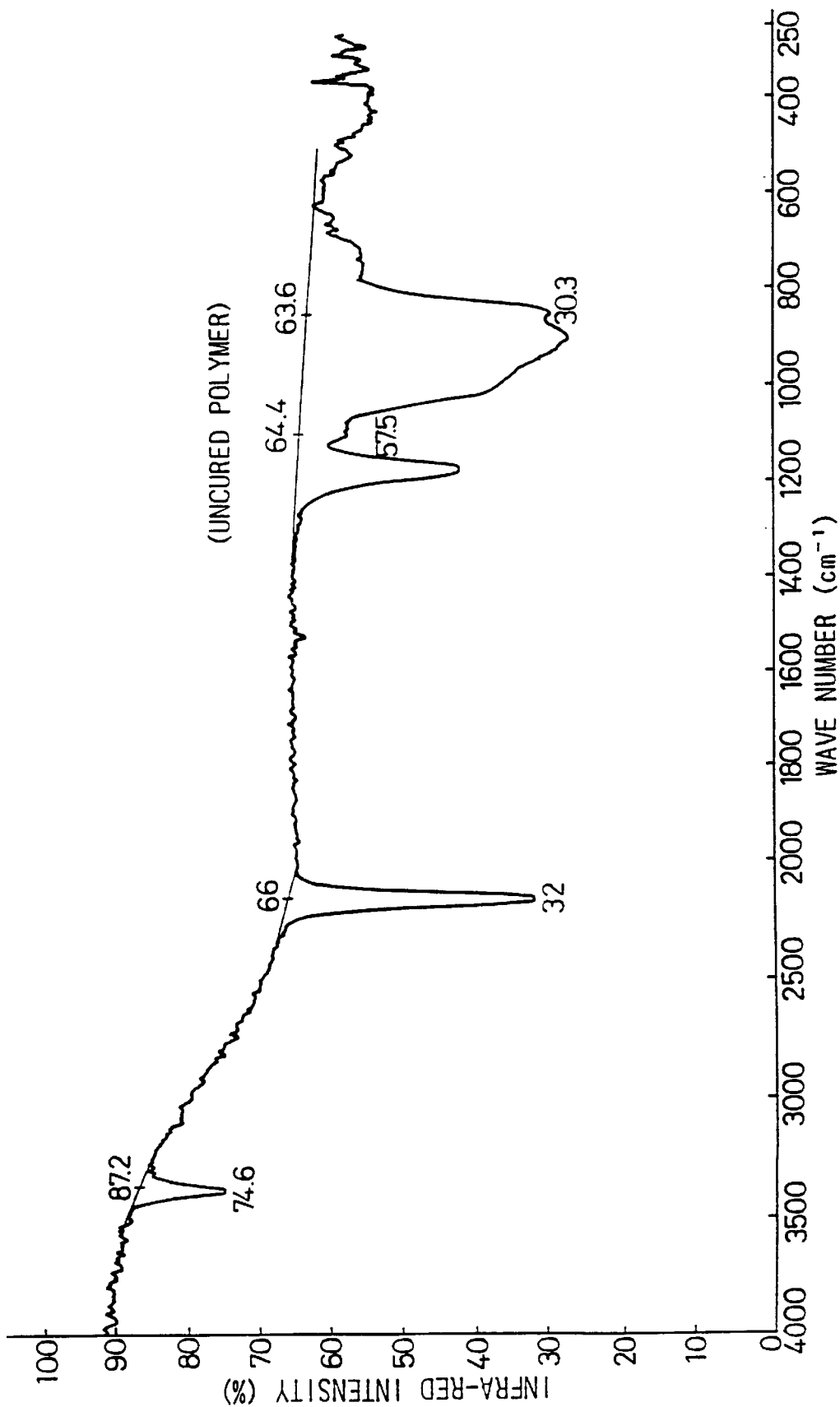
FIG. 1 is an IR spectrum for a polysilazane coating before being cured according to Example 1.

A polysilazane used in the practice of the invention may be any polysilazane having within the molecule at least all Si—H bond or N—H bond. Any copolymer or mixture containing a polysilazane and other polymers as well as a polysilazarie alone may be used.

A polysilazane used may have a chainlike, cyclic or crosslinked structure, or any combined structures thereof within the molecule. Any polysilazane alone or any mixture of polysilazanes may be used.

Representative examples of a polysilazane used include, but are not limited to, the following polysilazanes.

A polysilazane in which $R^1$, $R^2$ and $R^3$ are hydrogen atom in the above general formula (I) is a porhydropolysilazane, and the preparation method is reported in Japanese Unexamined Patent Publication (Kokai) No. 60-145903/1985 and D. Seyferth et al., Communication of Am. Cer. Soc., C-13, January 1983. A perlydropolysilazane prepared by these methods is a mixture of polymers having a variety of structures, and essentially contains within the molecule a chainlike part and a cyclic part which may be represented by the following formulae:

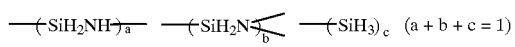

One example of the structure of a perhydropolysilazane is as follows:

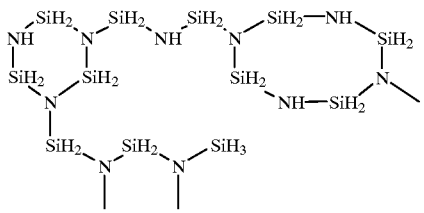

The preparation method for a polysilazane in which $R^1$ and $R^2$ are a hydrogen atom and $R^3$ is a methyl group in the general formula (I) is reported in D. Seyferth et al., Polym. Prepr. Am. Chem. Soc., Div. Polym. Chem. 25, 10 (1984). A polysilazane prepared by this method is a chainlike polymer and a cyclic polymer having a repeating unit of —(SiH$_2$NCH$_3$)—, and neither polymer has a crosslinked structure.

The preparation method for a polyorgano(hydro)silazane in which $R^1$ and $R^3$ are a hydrogon atom and $R^2$ is an organic group in the general formula (I) is reported in D. Seyferth et al., Polym, Prepr. Am. Chem. Soc., Div. Polym. Chem. 25, 10 (1984) and Japanese Unexamined Patent Publication (Kokai) No. 61-89230/1986. A polysilazane prepared by these methods is a polymer with a cyclic structure having a repeatng unit of —($R^2$SiHNH)— and mainly a polymerization degree of 3 to 5, and a polymer including within the molecule both chainlike and cyclic structures having the following formula:

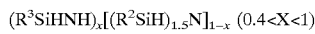

($R^3$SiHNH)$_x$[($R^2$SiH)$_{1.5}$N]$_{1-x}$ (0.4<X<1)

A polysilazane in which $R_1$ is a hydrogen atom and $R^2$ and $R^3$ are an organic group, and $R^1$ and $R^2$ are an organic group and $R^3$ is a hydrogen atom, in the general formula (I), has a cyclic structure with a repeating unit of —($R^1R^3$SiNR$^3$)— and mainly a polymerization degree of 3 to 5.

Representative examples of a polysilazane except for those within the general formula (I) include the following polysilazanes.

Some polyorgano(hydro)silazanes may have a crosslinked structure within the molecule as reported in D. Seyfertlh et al., Communication of Am. Cer. Soc., C-132, July 1984. One example is as follows:

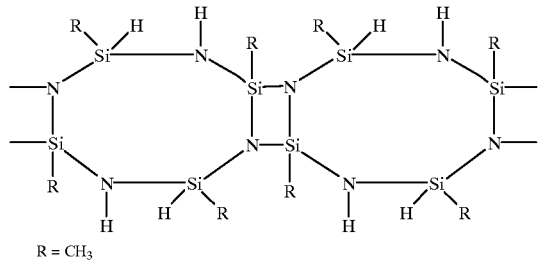

R = CH$_3$

Starting materials which may be used include a polysilazane [$R^1$Si(NH)$_x$] with a crosslinked structure prepared by ammonolysis of $R^1$SiX$_3$ (X=halogen) as reported in Japanese Unexamined Patent Publication (Kokai) No. 49-69717/1974, and a polysilazane with a structure represented by the following formula prepared by coammonolysis of $R^1$SiX$_3$ and $R^2_2$SiX$_2$.

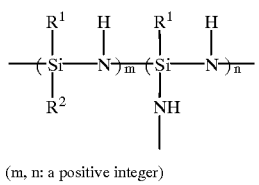

(m, n: a positive integer)

A polysilazane used has a skeleton comprising the unit represented by the above general formula (I), although the unit may be cyclized as described above. In that case, the cyclized part may be an end group, and in the case of no cyclization, the end group of the skeleton may be the same group as $R^1$, $R^2$ or $R^3$ or a hydrogen atom.

The preferred polysilazane used in the first aspect of the invention includes a polysilazane having as a skeleton the unit represented by the above general formula (I), and a modified polysilazane by adding to the polysilazane a metal alkoxide, a silicon alkoxide, an alcohol, a metal carboxylate, an acetylacetonato complex, and the like. These modified polysilazanes may be made into ceramics at lower temperature, thus are referred to as "low temperature ceramics-forming polysilazanes".

A specific example of such low temperature ceramics-forming polysilazanes includes a silicon alkoxide-added polysilazane described in our Japanese Unexamined Patent Publication (Kokai) No. 5-238827/1993. This modified polysilazane is silicon alkoxide-added polysilazane having an atomic ratio of silicon derived from the alkoxide to silicon derived from the polysilazane ranging from 0.001 to 3 and a number-average molecular weight of about 200 to 500,000, obtained by reacting the polysilazane of the above formula (I) with a silicon alkoxide represented by the following formula (II) with heating:

$$Si(OR^4)_4 \qquad (II)$$

wherein $R^4$ represents, which may be the same or different, a hydrogen atom, an alkyl or aryl group having 1 to 20 carbon atoms, with the proviso that at least one $R^4$ is the alkyl or aryl group. More preferably, $R^4$ is an alkyl group having 1 to 10 carbon atoms, and most preferably, an alkyl group having 1 to 4 carbon atoms. The atomic ratio of silicon derived from the alkoxide to silicon derived from the polysilazane preferably ranges between 0.05 and 2.5. The above-mentioned Japanese Unexamined Patent Publication (Kokai) No. 5-238827/1993 also describes the preparation of the silicon alkoxide-added polysilazane.

Another specific example of a low temperature ceramics-forming polysilazane includes a glycidol-added polysilazane described in our Japanese Unexamined Patent Publication (Kokai) No. 6-122852/1994. This modified polysilazane is a glycidol-added polysilazane having a weight ratio of glycidol to polysilazane ranging from 0.001 to 2 and a number-average molecular weight of about 200 to 500,000, obtained by reacting the polysilazane of the above formula (I) with glycidol. The weight ratio of glycidol to the polysilazane preferably ranges from 0.01 to 1, and more preferably from 0.05 to 0.5. The preparation of the glycidol-added polysilazane is also described in the above Japanese Unexamined Patent Publication (Kokai) No. 6-122852/1994.

Another specific example of a low temperature ceramics-forming polysilazane includes an alcohol-added polysilazane described in our Japanese Unexamined Patent Publication (Kokai) No. 6-240208/1994. This modified polysilazane is an alcohol-added polysilazane having a weight ratio of an alcohol to a polysilazane ranging from 0.001 to 2 and a number average molecular weight of about 100 to 500,000, obtained by reacting the polysilazane of the above formula (I) with an alcohol. The alcohol is preferably one having a boiling point of 110° C. or higher, for example, butanol, hexanol, octanol, nonanol, methoxyethanol, ethoxyethanol and furfuryl alcohol. The weight ratio of the alcohol to the polysilazane preferably ranges from 0.01 to 1, and more preferably from 0.05 to 0.5. The preparation of the alcohol-added polysilazane is also described in the above Japanese Unexamined Patent Publication (Kokai) No. 6-240208/1994.

Yet another specific example of a low temperature ceramics-forming polysilazane includes a metal carboxylate-added polysilazane described in our Japanese Unexamined Patent Publication (Kokai) No. 6-299118/1994. This modified polysilazane is a metal carboxylate-added polysilazane having a weight ratio of a metal carboxylate to a polysilazane ranging from 0.000001 to 2 and number-average molecular weight of about 200 to 500,000, obtained by reacting the polysilazane of the above formula (I) with a metal carboxylate containing at least one metal selected from the group consisting of nickel, titanium, platinum, rhodium, cobalt, iron, ruthenium, osmium, palladium, iridium and aluminum. The metal carboxylate is a compound represented by the formula $(RCOO)_nM$, wherein R is an aliphatic or alicyclic group having 1 to 22 carbon atoms, M is at least one metal selected from the above metal group, and n is the valence of M. The metal carboxylate may be an anhydrate or a hydrate. The weight ratio of the metal carboxylate to the polysilazane preferably ranges from 0.001 to 1, more preferably from 0.01 to 0.5. The chemical structure of the reaction product is not fully understood, but it is contemplated that Si—OCOR bonds are formed. The state of the metal is unclear, although it is assumed to be in the form of super fine particles. The preparation of the metal carboxylate-added polysilazane is also described in the above Japanese Unexamined Patent Publication (Kokai) No. 6-299118/1994.

Yet another specific example of a low temperature ceramics-forming polysilazane includes an acetylacetonato complex-added polysilazane described in our Japanese Unexamined Patent Publication (Kokai) No. 6-306329/1994. This modified polysilazane is an acetylacetonato complex-added polysilazane having a weight ratio of an acetylacetonato complex to a polysilazane ranging from 0.000001 to 2 and a number-average molecular weight of about 200 to 500,000, obtained by reacting the polysilazane of the above formula (I) with an acetylacetonato complex containing as a metal nickel, platinum, palladium or aluminum. The acetylacetonato complex containing a metal is a complex having a metal atom coordinated with the anions acac produced from acetylacetone (2,4-pentadione) by acid dissociation, and is represented by the formula $(CH_3COCHCOCH_3)_nM$, wherein M represents a metal having a valence of n. The weight ratio of the acetylacetonato complex to the polysilazane preferably ranges from 0.001 to 1, more preferably from 0.01 to 0.5. The preparation of the acetylacetonato complex-added polysilazane is also described in the above Japanese Unexamined Patent Publication (Kokai) No. 6-306329/1994.

Another specific example of a low temperature ceramics-forming polysilazane includes a fine metal particles-added polysilazane described in our Japanese Unexamined Patent Publication (Kokai) No. 7-196986/1995. This modified polysilazane is obtained by adding fine metal particles including Au, Ag, Pd and Ni to a coating solution containing as a major component the polysilazane of the above formula (I). The preferred metal is Ag. The fine metal particles preferably have a particle size of 0.5 $\mu$m or less, even more preferably 0.1 $\mu$m or less, even more preferably 0.05 $\mu$m or less. Particularly, it is preferred to use isolated super fine metal particles having a particle size of 0.005 to 0.01 $\mu$m dispersed in a high boiling point alcohol. The amount of the fine metal particle to be added ranges from 0.01 to 10 parts by weight, preferably from 0.05 to 5 parts by weight per 100 parts by weight of the polysilazane. The preparation of the fine metal particles-added polysilazane is also described in the above Japanese Unexamined Patent Publication (Kokai) No. 7-196986/1995.

The particularly preferred low temperature ceramics-forming polysilazane among the above is the metal carboxylate-added polysLlazane described in the above Japanese Unexamined Patent Publication (Kokai) No. 6-299118/1994. In particular, one in which the metal is palladium (Pd) is more preferred.

These polysilazanes or modified polysilazanes may be made into any desired form, i.e., thin film, fiber, bulk, powder. The polysilazanes or modified polysilazanes themselves may be made into forms, typically, they are dissolved in a suitable solvent such as hydrocarbons, for example, pentane, hexane, heptane, octane, nonane, decane, dodecane, cyclopentane, cyclohexane, cyclohexene, methylcyclohexane, ethylcyclohexane, decalin, p-menthane, tetralin, and the like; aromatic hydrocarbons, for example, benzene, toluene, xylene, diethyl benzene, mesitylene, and the like; ketones, for example, acetone, methyl isobutyl ketone (MIBK), and the like; esters, for example, methyl acetate, ethyl acetate, isobutyl acetate, and the like; others including methylene chloride, chloroform, tetrahydrofuran (THF), amines and pyridine, and made into forms, then dried. These solvents may be used alone, or may be used as a mixture of two or more solvents having different boiling points so as to improve the drying characteristics and/or formability of the polysilazane.

The polysilazane or polysilazane composition may optionally contain a variety of additives and fillers.

Ceramics formed by the method of the invention may be any three-dimensional part, although the method is particularly suitable for the formation of ceramic coatings since the ceramics may be formed at advantageously low temperature.

Thus, according to the present invention, a coating method is provided using the above-mentioned coating compositions. The coating method is characterized in that any of the above coating compositions is applied onto a substrate one or more times, then fired, and exposed to an atmosphere containing water vapor and/or immersed in distilled water containing a catalyst.

Suitable solvents for the coating composition may include hydrocarbons such as aliphatic hydrocarbons, alicyclic hydrocarbons and aromatic hydrocarbons; halogenated hydrocarbons such as halogenated methanes, halogenated ethanes and halogenated benzenes; ethers such as aliphatic ethers and alicyclic ethers. A preferred solvent is a halogenated hydrocarbon such as methylene chloride, chloroform, carbon tetrachloride, bromoform, ethylene chloride, ethylidene chloride, trichloroethane and tetrachloroethane; ethers such as ethyl ether, isopropyl ether, ethyl butyl ether, butyl ether, 1,2-dioxyethane, dioxane, dimethyl dioxane, tetrahydrofuran and tetrahydropyran; and hydrocarbons such as pentane, hexane, isohexane, methylpentane, heptane, isoheptane, octane, isooctane, nonane, decane, dodecane, cyclopentane, methylcyclopentane, cyclohexane, cyclohexene, methylcyclohexane, ethlcyclohexane, decalin, tetralin, p-menthane, benzene, toluene, xylene, ethybenzene, diethylbenzene and mesitylene. In use of these solvents, two or more solvents may be combined to control the rate of evaporation of the solvents and/or the solubility of the low temperature ceramics-forming polysilazane.

The amount (ratio) of the solvent(s) to be used may be selected to achieve better workability for a certain coating method to be used. It may also vary depending on the average molecular weight, the distribution of molecular weight and the structure of the polysilazane to be used, therefore, the amount may be selected as desired. Preferably, the amount is such that the content of the polysilazane ranges from 0.01 to 70% by weight.

The coating composition of the invention may optionally contain suitable fillers and/or extenders. Examples of the fillers include fine particles of oxide based inorganics including silica, alumina, zirconia and mica or non-oxide inorganics including silicon carbide, silicon nitride, and the like. For some applications, metal powders of aluminum, zinc, copper, and the like, may be added. Specific examples of the fillers include sols such as silica sol, zirconia sol, alumina sol and titania sol; silicas such as silica sand, quartz, novaculite and diatomaceous earth; synthesized amorphous silica; silicates such as kaolinite, mica, talc, wollastonite, asbestos, calcium silicate and aluminum silicate; glass bodies such as glass powder, glass balls, hollow glass balls, glass flakes and foam glass; non-oxide inorganics such as boron nitride, boron carbide, aluminum nitride, aluminum carbide, silicon nitride, silicon carbide, titanium boride, titanium nitride and titanium carbide; calcium carbonate; metal oxides such as zinc oxide, alumina, magnesia, titanium oxide and beryllium oxide; other inorganics such as barium sulfate, molybdenum disufide, tungsten disufide and carbon fluoride; metal powders such as aluminum, bronze, lead, stainless steel and zinc; and carbons such as carbon black, coke, graphite, pyrocarbon and hollow carbon. Preferred fillers are super fine particles of oxide inorganics such as zinc oxide, titanium oxide, aluminum oxide and zirconium oxide, and silica sol.

For these fillers, a variety of forms such as needles (including whiskers), particles and flakes may be used alone or by combing two or more forms. The fillers preferably have a particle size less than the thickness of the coating which may be applied at one time. The amount of the fillers to be added ranges from 0.01 to 100 parts by weight, preferably from 0.1 to 10 parts by weight per part by weight of the low temperature ceramics-forming polysilazane.

The coating composition may optionally contain a variety of pigments, leveling agents, antifoamers, antistats, UV absorbers (including zinc oxide, titanium oxide, and the like), pH adjustors, dispersants, surface modifiers, plasticizers, drying accelerators and antirunning agents.

Substrates which are coated with the coating composition are not limited, and may be any of metals, ceramics, plastics, and the like. The coating composition of the present invention is most useful when applied to materials such as plastics which are generally unsuitable for high temperature treatment.

The use of coating compositions having an ultraviolet absorber incorporated therein allows a ceramic protective coating with UV absorbing function to be applied to plastics, glass (e.g. reinforced glass), and the like, therefore, provision of hardness to substrates, protection of plastics from deterioration by UV radiation, easy production of UV-cut glass, and the like, may be advantageously achieved.

Plastics which may be used in the invention include a variety of plastic materials. For example, they include polyethylene terephthalate (PET), polyimide (PI; e.g., the condensation product from pyromellitic acid anhydride and diaminodiphenylether commercially available under the trademark "KAPTON"), polycarbonate (PC), biaxial oriented polypropylene (OPP), polyphenylene sulfide (PPS), polyethylene naphthalate (PEI), polyether sulfone (PES), polyetherimide (PET), polyetheretherketone (PEEK), polyarylate (PAR), biaxial oriented para-aramide, norbornene-based polyolefin, polyvinyl chloride, and the like. These plastic materials to be used may have any form, area and thickness depending on applications. The preferred form of the plastic materials for the invention is film. The film may comprise a support having thereon a very thin film.

The plastic materials may be subjected to a pretreatment such as filing, degreasing, various forms of blasting, corona discharge treatment, application of silane coupling agent, and the like, as desired.

In addition to plastics, the coating composition of the invention may be applied to surfaces of stocks such as paper and wood, and surfaces of gold or silver coatings.

According to the present invention, the coating composition as described above may be applied to the plastic material as described above, particularly to at least one side of a plastic film, to form a coating of the low temperature ceramics-forming polysilazane. For application methods, any coating method which is commonly used to coat plastic materials, i.e., dipping, roll coating, bar coating, brush coating, spray coating, flow coating, and the like, may be used. A particularly preferred method is gravure coating.

The coating composition of the invention is made into forms or coated by such methods as described above, then converted to silica by the above-mentioned method, so as to form a tough molded form or coating.

The conditions for firing depend on the polysilazane or the coating composition used, and may be selected for the particular substrate or article to be coated. The low temperature ceramics-forming polysilazane may be made into ceramics at lower temperatures than a polysilazane containing no additives by a typical firing method rather than the particular low temperature forming method.

Typical firing conditions when low temperature ceramics-forming compositions (in particular, those added with a metal carboxylate, an acetylacetonato complex and fine metal particles) are used and a low temperature ceramics-forming method is not used, ranges from 500 to 1000° C. A preferred firing temperature ranges from 250 to 400° C., more preferably from 250 to 350° C.

The atmosphere for firing may be an oxygen-, air- or inert gas-containing atmosphere. An air-containing atmosphere is more preferred. Firing in an air-containing atmosphere allows oxidation of a low temperature ceramics-forming composition or hydrolysis thereof due to water vapor present in the air to proceed, and makes it possible to form a tough coating composed essentially of Si—O or Si—N bonds at low temperature as described above.

For some types of low temperature ceramics-forming compositions to be coated, the conversion to ceramics may be insufficient under limited firing conditions. In this case, the fired coating may be kept at a temperature below 50° C. for a long time so as to improve the quality of the coating. The keeping atmosphere for this case is preferably air, more preferably humid air having increased vapor pressure. The keeping time is not specifically limited, and suitably ranges from 10 minutes to 30 days in practice. The keeping temperature is not specifically limited, and suitably ranges from 0° C. to below 50° C. in practice. Of course, it should be effective to keep it at 50° C. or higher, although the heat treatment of 50° C. or higher is defined herein as "firing". That is, it is effective to fire at a given temperature for a predetermined time, then to fire at a lower temperature such as 50° C. for a long time, though this process is one of the varieties of said "heat-fire" process.

Keeping in an air-containing atmosphere allows oxidation of the low temperature ceramics-forming composition or hydrolysis, due to water vapor present in the air, to proceed and complete the conversion to ceramics, and makes it possible to form a tougher coating. According to the above-mentioned methods, the firing temperature may be lowered, and various problems due to a high firing temperature may be alleviated.

For some types of low temperature ceramics-forming compositions to be coated, firing at or above 50° C. is not carried out, and the coating may be kept at less than 50° C. for a long time so as to improve the quality of the coating. The keeping atmosphere for this case is preferably air, more preferably humid air having increased vapor pressure. The keeping time is not specifically limited, and suitably ranges from 10 minutes to 30 days in practice. The keeping temperature is not specifically limited, and suitably ranges from 0° C. to below 50° C. in practice. It should be effective to keep it at 50° C. or higher, although the heat treatment of 50° C. or higher is defined herein as "firing". Keeping in an air-containing atmosphere allows oxidation of the reaction product of a metal carboxylate and a polysilazane or hydrolysis thereof, due to vapor present in the air to proceed and complete the conversion to ceramics, and makes it possible to form a tough coating composed essentially of Si—O or Si—N bonds. According to the above-mentioned methods, various problems due to a high firing temperature may be alleviated, and conversion to ceramics at about room temperature may be realized for some cases.

In case of using the low temperature ceramics-forming method of the invention, the rate for raising the temperature is not specifically limited, and preferably ranges from 0.5 to 5° C./min. A preferred firing temperature ranges from room temperature to 250° C., and when coating plastics, and the like, heat treatment is carried out at a temperature which does not adversely affect the plastic material, preferably at 150° C. or below. Generally, heat treatment of 150° C. or higher damages plastic materials such that they deform or deteriorate in strength. However, highly heat resistant plastic materials such as polyimides may be treated at a high temperature, and this heat treatment temperature may be appropriately determined depending on the type of the plastic materials by those skilled in the art. The atmosphere for firing may be an oxygen-, air- or inert gas-containing atmosphere. An air-containing atmosphere is more preferred.

In the heat treatment at the above-mentioned temperature, a coating containing Si—O, Si—N, Si—H and N—H bonds is formed. This coating is not yet sufficiently converted to ceramics. This coating may be converted to ceramics by either one or both of the two methods described below.

(1) Heat Treatment in an Atmosphere Containing Water Vapor

The pressure is not specifically limited, though an atmospheric pressure of 1 to 3 atm is suitable in practice. A temperature of room temperature or higher is effective, and a preferred temperature ranges from room temperature to 150° C. The relative humidity is not specifically limited, though a range from 10% RH to 100% RH preferred. The heat treatment time is not specifically limited, and a range from 10 minutes to 30 days is suitable in practice.

Heat treatment in a vapor-containing atmosphere allows oxidation of a polysilazane or a modified polysilazane to proceed and makes it possible to form tough ceramics, particularly a ceramic coating, composed essentially of Si—O bonds at a low firing temperature as described above. The $SiO_2$-coating is derived from a polysilazane, and therefore contains 0.01 to 5 atom % of nitrogen. If the nitrogen content is greater than 5%, the coating is insufficiently converted into ceramics, in turn, the desired properties such as abrasion resistance and gas barrier properties cannot be obtained. On the other hand, it is difficult to reduce the nitrogen content to less than 0.01%. The preferred nitrogen content ranges from 0.05 to 5%, more preferably 0.1 to 3%.

(2) Immersion in a Solution of a Catalyst in Distilled Water

A catalyst is preferably an acid and a base, and includes, but is not limited to, amines such as triethylamine, diethylamine, monoethanolamine, diethanolamine, triethanolamine, n-hexylamine, n-butylamine, di-n-butylamine, tri-n-butylamine, guanidine, piguanine, imidazole, 1,8-diazabicyclo-[5.4.0]-7-undecene and 1,4-diazabicyclo-[2.2.2]-octane; alkalis such as sodium hydroxide, potassium hydroxide, lithium hydroxide, pyridine and aqueous ammonia; inorganic acids such as phosphoric acid; organic acids such as lower monocarboxylic acids, e.g., glacial acetic acid, anhydrous acetic acid, propionic acid and anhydrous propionic acid, or anhydrides thereof, lower dicarboxylic acids, e.g., oxalic acid, fumaric acid, maleic acid and succinic acid, or anhydrides thereof, and trichloroacetic acid; perchloric acid, hydrochloric acid, nitric acid, sulfuric acid, sulfonic acid, p-toluenesulfonic acid and boron trifluoride and their complexes with electronic donors; Lewis acids such as $SnCl_4$, $ZnCl_2$, $FeCl_3$, $AlCl_3$, $SbCl_3$ and $TiCl_4$ and their complexes. A preferred catalyst is hydrochloric acid. The solution has a content of the catalyst ranging from 0.01 to 50 wt %, preferably from 1 to 10 wt %. The solution is useful at a temperature ranging from room temperature to the boiling point of the solution. The holding time is not specifically limited, and a range from 10 minutes to 30 days is suitable in practice.

Immersion in a solution of a catalyst in distilled water allows oxidation of a polysilazane or a modified polysilazane or hydrolysis thereof with water to be accelerated due to the presence of the catalyst, and makes it possible to form a tough ceramics, particularly ceramic coatings, composed essentially of Si—O bonds at a low firing temperature as desired above. Similarly, the $SiO_2$-coating is derived from a polysilazane, and therefore contains 0.01 to 5 atom %, preferably 0.05 to 5 atom % of nitrogen.

According to another aspect of the invention, contact with $Pd^{2+}$ ions and water has been found to allow a polysilazane to be oxidized into ceramics, particularly silica, generally at low temperature.

Thus, in accordance with the present invention, a method for forming ceramics is provided characterized in that a polysilazane having a number average molecular weight of 100 to 50,000 is brought into contact with $Pd^{2+}$ ions and water, the polysilazane having a skeleton comprising the unit represented by the following general formula (I):

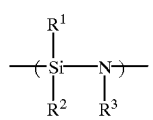

(I)

wherein $R^1$, $R^2$ and $R^3$ each independently represents a hydrogen atom, an alkyl group, an alkenyl group, a cycloalkyl group, an aryl group, a group other than the above and having a carbon atom directly attached to the silicon atom, an alkylsilyl group, an alkylamino group and an alkoxy group; with the proviso that at least one of $R^1$, $R^2$ and $R^3$ is a hydrogen atom.

The polysilazanes which have been described herein so far may be used. The methods for making forms or coatings thereof may also be the same as those described herein so far.

Immersing a form or a coating of a polysilazane in an aqueous solution containing $Pd^{2+}$ ions produces hard silica at a low temperature of 100° C. or lower. Alternatively, contact of a polysilazane containing $Pd^{2+}$ ions with water vapor at a low temperature also produces silica. From these or other observations, it has been found that apparently a polysilazane having Si—H or N—H bonds is converted to ceramics composed mainly of silica in a system containing $Pd^{+2}$ ions and water as essential components. Specifically, it is contemplated, but not determined with certainty, that O (Oxygen) from $H_2O$ activated upon reduction of $Pd^{2+}$ reacts with a polysilazane and allows a reaction to proceed by the following mechanism:

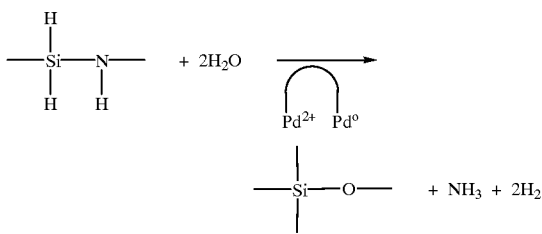

The method for providing $Pd^{2+}$ ions is not specifically limited, and includes, for example, dissolving in water a palladium compound (salt) such as palladium acetate, palladium acetylacetonate, palladium chloride, palladium hydroxide, palladium iodide, palladium nitrate and palladium oxide; adding (dissolving) metal palladium to aqueous acid such as hydrochloric acid and nitric acid; and elating $Pd^{2+}$ ions by applying a voltage to metal palladium in an aqueous solution. Alternatively, it is possible to adopt a method such as contacting a polysilazane containing a palladium compound with water, or contacting a polysilazane containing metal palladium with an acid (generally, an aqueous solution thereof).

The amount of $Pd^{2+}$ ions to be provided is preferably an equimolar amount or more of the total amount of Si—H and Si—N groups in the polysilazane in order to obtain ceramics having a composition similar to silica ($SiO_2$). However, when (1) an oxidizing catalyst for $Pd^0$ (palladium having a valence of zero) such as $CuCl_2$ is present in the reaction system, or when (2) an operation is carried out to oxidize $Pd^0$ electrochemically at the same time, a smaller amount of $Pd^{2+}$ ions than described above results in a similar effect. In the present invention, a minor amount of $Pd^{2+}$ ions produces a significant effect, therefore, its amount is not limited to the above-defined preferred range. Accordingly, when operations (1) or (2) above are not carried out, $Pd^{2+}$ ions are provided in an amount of generally 1/100 moles or more, preferably 1/10 moles or more, more preferably one mole or more, and practically 1/10 moles or more, for the total molar amount of Si—H and Si—N groups in a polysilazane.

When the amount of addition of Pd is 1/10 moles as described above, the weight amount of addition of Pd is conveniently obtained by multiplying by 0.2 the molar amount of Si (silicon) in the polysilazane.

The method for providing water may include immersing the polysilazane into water, spraying water onto the polysilazane, exposing the polysilazane to water vapor, and the like. In these cases, $Pd^{2+}$ ions may have been dissolved in water.

The amount of water to be provided is preferably an equimolar amount or more of the total amount of Si—H and Si—N groups in the polysilazane in order to obtain ceramics having a composition similar to silica ($SiO_2$). Usually, a great excess of water is used.

Reaction conditions for converting the polysilazane to ceramics, for example, the pH of an aqueous solution containing $Pd^{2+}$ ions, reaction temperature, reaction pressure and reaction atmosphere are not specifically limited. The reaction temperature may optionally be achieved by heating, though the reaction may proceed sufficiently at a temperature of 100° C. or below. For example, a temperature of 80° C. or below, even 40° C. or below, may be useful.

In accordance with the method of contacting the polysilazane with $Pd^{2+}$ ions and water, ceramics composed mainly of silica are generally produced at low temperature. This method is particularly suitable for a method for forming a silica coating at low temperature.

The thickness of the $SiO_2$ coating obtained by one application in accordance with the present invention ranges preferably from 50 Å to 5 μm, more preferably from 100 Å to 2 μm. If the coating thickness is greater than 5 μm, cracking may often occur during heat treatment, flexibility of the coating may deteriorate, and cracking and/or peeling of the coating is likely to occur due to bending. On the other hand, if the thickness is less than 50 Å, the expected effect such as the desired gas barrier properties and abrasion resistance may not be achieved. The thickness may be controlled by varying the concentration of the coating composition. That is, if the thickness of the coating is desired to be increased, the solid content of the coating composition may be increased (the concentration of the solvent may be decreased). Alternatively, the coating composition may be applied more than one time so as to increase the coating thickness.

To impart other functions, it is possible to add any functional filler or to apply a variety of layers as carried out traditionally in the art. For example, fine metal oxide particles having a UV-absorbing function such as ZnO, $TiO_2$, and the like, may be added to impart a UV-absorbing function, fine electroconductive particles may be added to provide electroconductivity, and intermediate flexible layers may be laminated to impart bending properties.

Thus, in accordance with the present invention, a method for forming ceramics characterized by adding a UV absorber to the polysilazane or the modified polysilazane as described above, and an ultraviolet ray-blocking article formed by the method, is provided.

Any UV absorber may be used which exhibits the feature of absorbing ultraviolet rays. The absorber is preferably fine particles of at least one metal oxide selected from the group consisting of ZnO, $TiO_2$ and $Se_2O_3$ for its good compatibility with a polysilazane. UV absorbing fine particles of metal oxide used in the invention allow the $SiO_2$ coating to transmit visible light when the particles are super fine particles having an average particle size of 1.0 μm or less, preferably 0.05 μm or less. It is difficult to obtain super fine particles of a metal oxide having smaller average particle sizes, on the contrary, it is difficult to produce a transparent ceramic coating with a larger average particle size. Therefore, the lower limit of the average particle size of the super fine particles of the metal oxide used in generally 0.005 μm, preferably 0.01 μm, the upper limit thereof is 1.0 μm, preferably 0.05 μm, but both limits are not restricted thereto.

The UV absorbing effect diminishes as the added amount of the UV absorbing fine particles of the metal oxide is reduced, therefore, the lower limit of the added amount of the fine particles of the metal oxide is 5 parts, preferably 15 parts by weight relative to 100 parts by weight of the combined weight of a polysilazane and fine particles of the metal oxide. On the other hand, an excessive amount of the particles may lead to voids formed in the coating, therefore, the upper limit thereof is 95 parts, preferably 85 parts by weight. A preferred amount of the fine particles of the metal oxide to be added ranges from 50 to 80 parts by weight, more preferably from 60 to 70 parts by weight relative to 100 parts by weight of the combined weight with a polysilazane. Further, fine particles of the metal oxide should be dispersed uniformly in a polysilazane coating composition. To disperse the particles uniformly, agitating, supersonic dispersing, ball-mill dispersing, ball milling, vibration milling, paint shakers, atrittors, and the like, may be appropriately used to carry out the treatment for dispersion, depending on the degree of dispersion of the fine particles of the metal oxide as obtained.

An article protected from ultraviolet rays according to the present invention may be produced by preparing a coating composition containing a polysilazane and UV absorbing fine particles of a metal oxide in a suitable solvent, followed by applying the composition to at least one side of an article such as transparent plastics and glass, then converting the composition to ceramics. An article protected from ultraviolet rays thus obtained may exhibit a transmittance for visible light of 80% or higher, even 95% or higher, while reducing the transmittance of ultraviolet rays having a wavelength of 370 nm down to 10%.

According to the present invention, an $SiO_2$ coating without a UV-absorber may be formed on such UV-cutting coatings as described above. These additional $SiO_2$ coatings have higher hardness than $SiO_2$ coatings containing UV absorbing fine particles of a metal oxide, and are transparent, therefore, these additional $SiO_2$ coatings may be used as an overcoat so as to further improve the hardness (abrasion resistance) of the article protected from ultraviolet rays according to the present invention.

EXAMPLES

The following examples further illustrate the present invention.

A Method for Forming Ceramics at Low Temperature

Example 1 (example for water vapor atmosphere)

A coating solution containing 20% perhydropolysilazane Type-1 made by Tonen Corporation (PHPS-1; number-average molecular weight: 600 to 800) in xylene was prepared. The solution was then filtered with a polyethylene terephthalate (PTFE) filter having a pore size of 0.2 $\mu$m. The filtrate was coated with a spin coater onto a 2 cm×2 cm wafer of silicon cut out from a wafer having a diameter of 4 inches and a thickness of 0.5 mm (2000 rpm, 20 sec.), and then precured in the ambient atmosphere at 100° C. for one hour. At this stage, the degree of conversion to ceramics was evaluated by IR and found to be 89.5% as a percentage of the residual SiH. The evaluation was based on the following equation.

Percentage of the residual SiH=(Optical absorbance due to SiH after heating/Optical absorbance due to SiN before heating)×100(%)

Ratio of SiO/SiN=optical absorbance due to SiH after heating/Optical absorbance due to SiN after heating Both values indicate the progress to ceramics, and they indicate that the lower the percentage of the residual SiH or the higher the ratio of SiO/SiN, the more the degree of progress to ceramics.

The characteristic absorbances used for SiN, SiO and SiH were those located at about 840, 1160 and 2160 $cm^{-1}$, respectively.

Absorbance is calculated by the following equation.

Absorbance=log($I_0$/I)

wherein, I represents the transmittance for an absorbance peak and $I_0$ represents the transmittance for the base of the peak.

The precured coating was heated in a saturated water vapor atmosphere under a pressure of 2.66 atm at 130° C. for 1 hour. The coating was evaluated by IR for its degree of progress to ceramics, and was found to be 0% for the percentage of the residual SiH, and to have no absorbance due to the Si—N bond. Further, absorbances due to the Si—OH bond at 940 $cm^{-1}$ and to the O—H bond at 3400 $cm^{-1}$ were found.

Figure 2:
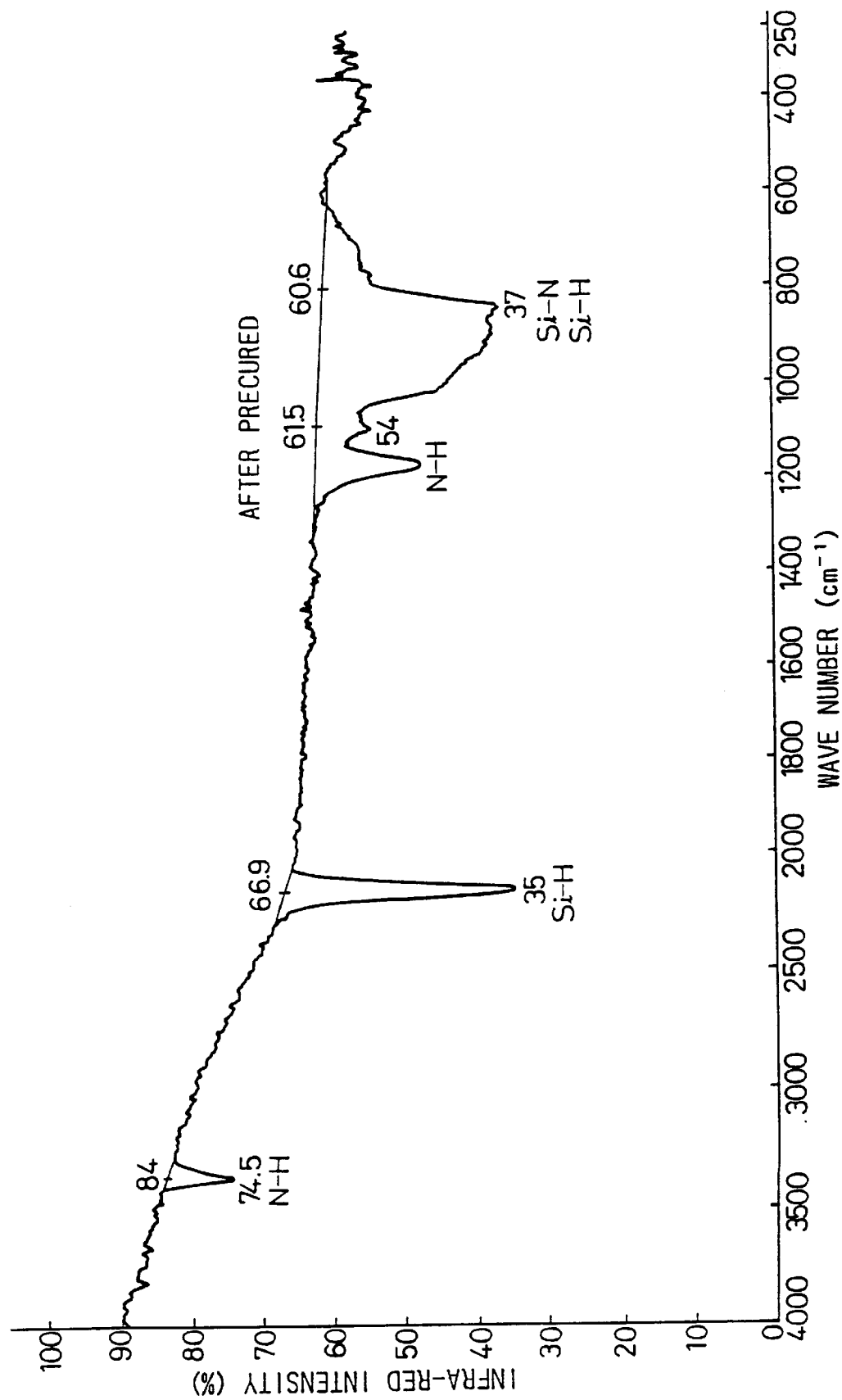
FIG. 2 is an IR spectrum for a polysilazane coating after being precured according to Example 1.
Figure 3:
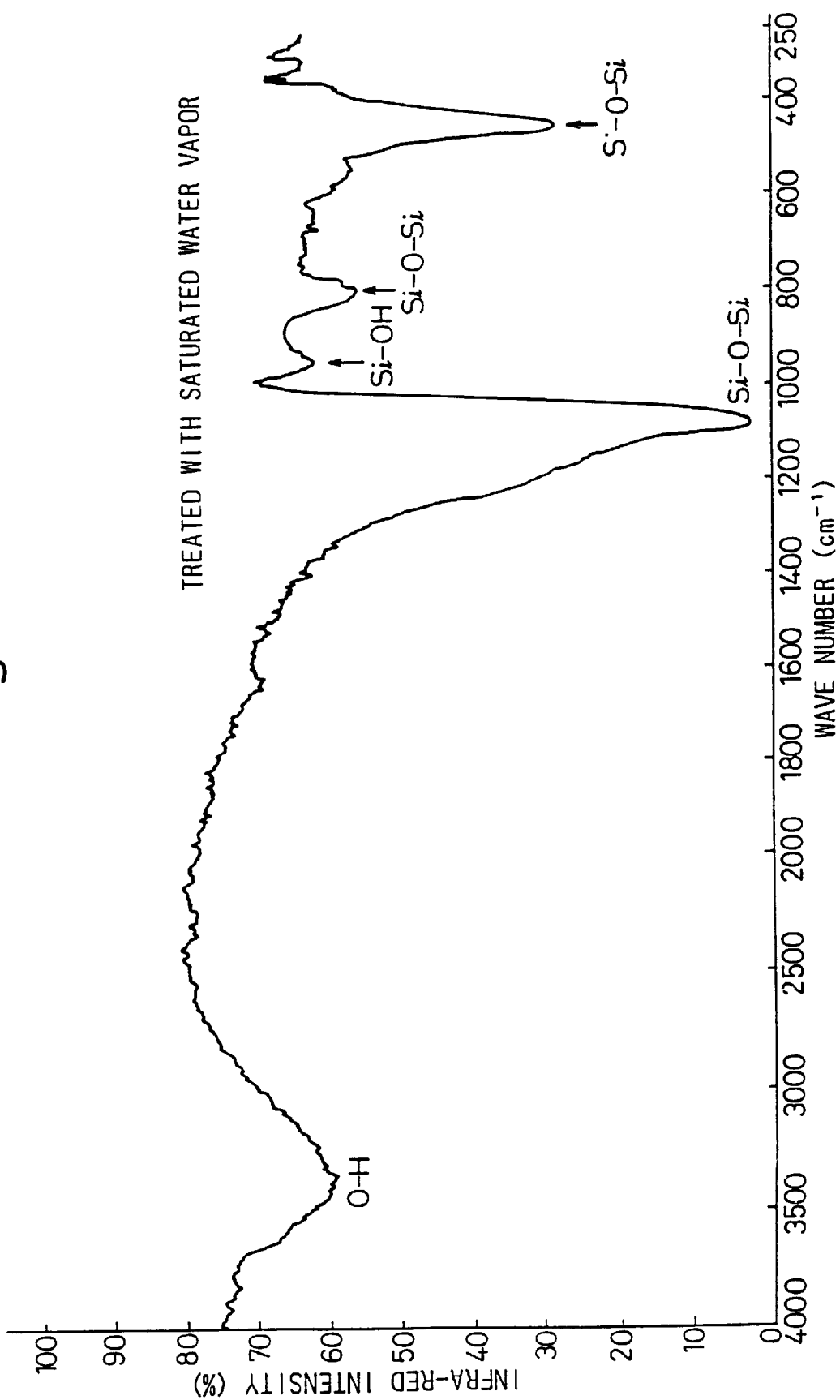
FIG. 3 is an IR spectrum for a polysilazane coating after being heated with water vapor according to Example 1.

FIGS. 1 to 3 are IR spectra used for evaluation of the degree of progress to ceramics. FIG. 1 is an IR spectrum for the polymer before curing, FIG. 2 is an IR spectrum for the coating after precuring, and FIG. 3 is an IR spectrum for the coating after heating with saturated water vapor.

Example 2 (example for distilled water and a catalyst (hydrochloric acid))

To 10 g of a solution containing 20% perhydropolysilazane Type-1 made by Tonen Corporation (PHPS-1; number-average molecular weight: 900) in xylene was added 4 g of a solution containing 0.5% of palladium (II) propionate (made by N. E. Chemcat Ltd.) in xylene. Additionally, 6 g of xylene was added to the solution, and the reaction was carried out in the ambient atmosphere at 20° C. for 3 hours with stirring. The reaction solution was concentrated to prepare a solution having a concentration of 20 wt %. This product was determined by GPC to have a number-average molecular weight of 961.

This solution was used as a coating solution, and filtered with a PTFE filter having a pore size of 0.2 $\mu$m. The filtrate was then coated with a spin coater onto a silicon wafer having a diameter of 4 inches and a thickness of 0.5 mm (2000 rpm, 20 sec.), and then precured in the ambient atmosphere at 150° C. for one hour. At this stage, the degree of progress to ceramics was evaluated by IR (as described in Example 1) and found to be 11.5% as a percentage of the residual SiH.

A solution containing 1 wt % of hydrochloric acid in distilled water was prepared. In the solution, the above-prepared coating was immersed at room temperature for 24 hours, then dried at 100° C. for 2 hours. This coating had a thickness of 7863 Å. The coating was evaluated by IR for its degree of conversion to ceramics, and was found to have 0% of residual SiH, and to have no absorbance due to the Si—N bond. Further, absorbances due to the Si—OH bond at 940 $cm^{-1}$ and to the O—H bond at 3400 $cm^{-1}$ were found.

This coating was treated with a combined solution of 18 ml of 49% hydrofluoric acid (from DAIKIN KOGYO K.K.) and 1763 ml of 61% nitric acid (from KOSO CHEMICAL K.K.). After the treatment, the coating had an etching rate of 1485 Å/min.

On the other hand, a coating prepared by a similar process except that distilled water without any catalyst was used, exhibited an etching rate of 1703 Å/min.

Example 3 (example for distilled water and a catalyst (DBU))

To 10 g of a solution containing 20% of perhydropolysilazane Type-1 made by Tonen Corporation (PHPS-1; number-average molecular weight: 900) in xylene was added 4 g of a solution containing 0.5% of palladium (II) propionate (made by N. E. Chemcat Ltd.) in xylene. Additionally, 6 g of xylene was added to the solution, and the reaction was carried out in the ambient atmosphere at 20° C. for 3 hours with stirring. The reaction solution was concentrated to prepare a solution having a concentration of 20 wt %. This product was determined by GPC to have a number-average molecular weight of 961.

This solution was used as a coating solution, and filtered with a PTFE filter having a pore size of 0.2 $\mu$m. The filtrate was then coated with a spin coater onto a silicon wafer having a diameter of 4 inches and a thickness of 0.5 mm (2000 rpm, 20 sec.), and then precured in the ambient atmosphere at 150° C. for one hour. At this stage, the degree of conversion to ceramics was evaluated by IR (as described in Example 1) and found to have 11.5% of the residual SiH.

A solution containing 1 wt % of 1,8-diaza-bicyclo-[5.4.0]-undecene-7 (TOKYO KASEI K.K.) in distilled water was prepared. In the solution, the above-prepared coating was immersed at room temperature for 24 hrs, then dried at 100° C. for 2 hours. This coating had a thickness of 7659 Å. The coating was evaluated by IR for its degree of conversion to ceramics, and was found to have 0% residual SiH, and to have no absorbance due to the Si—N bond. Further, absorbances due to the Si—OH bond at 940 cm$^{-1}$ and to the O—H bond at 3400 cm$^{-1}$ were found.

This coating was treated with a combined solution of 18 ml of 49% hydrofluoric acid (from DAIKIN KOGYO K.K.) and 1763 ml of 61% nitric acid (from KOSO CHEMICAL K.K.). After the treatment, the coating had an etching rate of 1437 Å/min.

Example 4 (example for distilled water and a catalyst (DBU))

To 10 g of a solution containing 20% perhydropolysilazane Type-1 made by Tonen Corporation (PHPS-1; number-average molecular weight: 900) in xylene was added 4 g of a solution containing 0.5% of palladium (II) propionate (made by N. E. Chemcat Ltd.) in xylene. Additionally, 6 g of xylene was added to the solution, and the reaction was carried out in the ambient atmosphere at 20° C. for 3 hours with stirring. The reaction solution was concentrated to prepare a solution having a concentration of 20 wt %. This product was determined by GPC to have a number-average molecular weight of 961.

This solution was used as a coating solution, and filtered with a PTFE filter having a pore size of 0.2 μm. The filtrate was then coated by a spin coater onto a silicon wafer having a diameter of 4 inches and a thickness of 0.5 mm (2000 rpm, 20 sec.), and then dried at room temperature.

A solution containing 1 wt % of 1,8-diaza-bicyclo-[5.4.0]-undecene-7 (TOKYO KASEI K.K.) in distilled water was prepared. In the solution, 90° C., the above-prepared coating was immersed for 30 min. The coating was evaluated by IR and was found to be almost $SiO_2$.

Reference Example 1 [Synthesis of a perhydropolysilazane]

A 1 L four-necked flask was equipped with a gas-inlet tube, a mechanical stirrer and a Dewar condenser. The reactor was flushed with dry deoxygenated nitrogen gas, and 490 ml of dry deaerated pyridine was charged into the flask and cooled with ice. Then 51.9 g of dischlorosilane was added to the pyridine to form a white solid adduct ($SiH_2Cl_2 \cdot 2C_5H_5N$). The reaction mixture was cooled with ice, to which 51.0 g of ammonia produced by passing through a sodium hydroxide tube and an activated carbon tube was blown with stirring, and then heated at 100° C.

On completion of the reaction, the reaction mixture was separated by centrifugation, washed with dry pyridine, and filtered under a dry nitrogen gas atmosphere to provide 850 ml of the filtrate. The solvent in 5 ml of the filtrate was removed under reduced pressure to provide 0.102 g of resin-like solid perhydropolysilazane.

Figure 4:
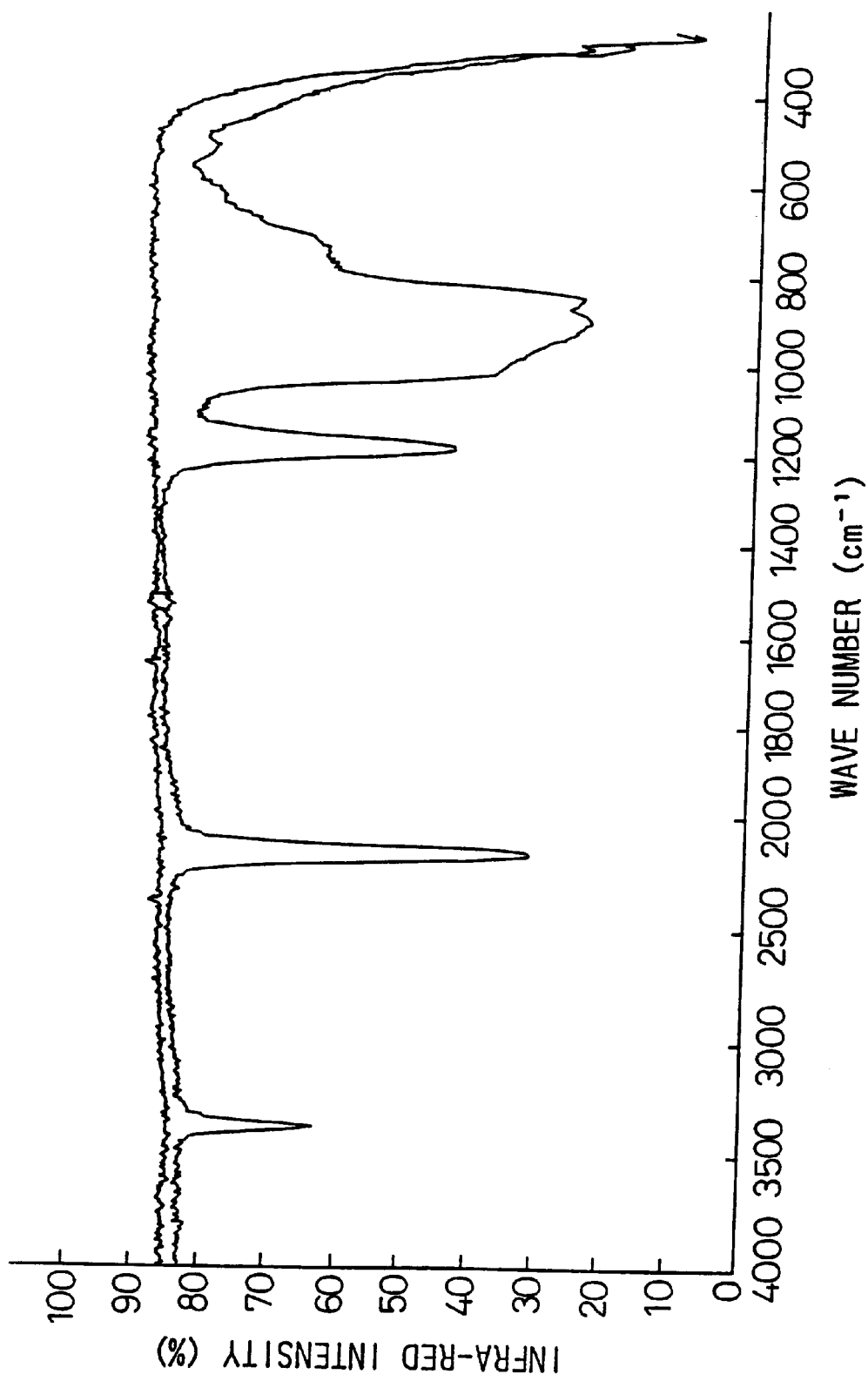
FIG. 4 is an IR spectrum for a perhydropolysilazane according to Reference Example 1.

The resultant polymer was determined by a cryoscopic method (solvent: dry benzene) to have a number-average molecular weight of 1120. Its IR (Infrared) spectrum (solvent: dry o-xylene; the concentration of perhydropolysilazane; 10.2 g/l) showed absorptions due to N—H at wavenumbers (cm$^{-1}$) 3350 and 1175; an absorption due to Si—H at 2170; and an absorption due to Si—N—Si at 1020 to 820. The IR spectrum is shown in FIG. 4.

Reference Example 2 [Synthesis of a polymethyl (hydro)silazane]

A 500 ml four-necked flask was equipped with a gas-inlet tube, a mechanical stirrer and a Dewar condenser. The reactor was flushed with dry deoxygenated nitrogen gas, then methyldichlorosilane ($CH_3SiHCl_2$, 24.3 g, 0.221 mole) and 300 ml of dry dichloromethane were charged into the flask. The reaction mixture was cooled with ice, and which 20.5 g (1.20 mole) of dry ammonia was blown together with a nitrogen gas with stirring to cause ammonolysis.

On completion of the reaction, the reaction mixture was separated by centrifugation and filtered. The solvent was removed under reduced pressure from the filtrate to provide 8.79 g of polymethyl(hydro)silazane as a transparent liquid. The resultant product was determined by a cryoscopic method (solvent: dry benzene) to have a number-average molecular weight of 310.

Figure 5:
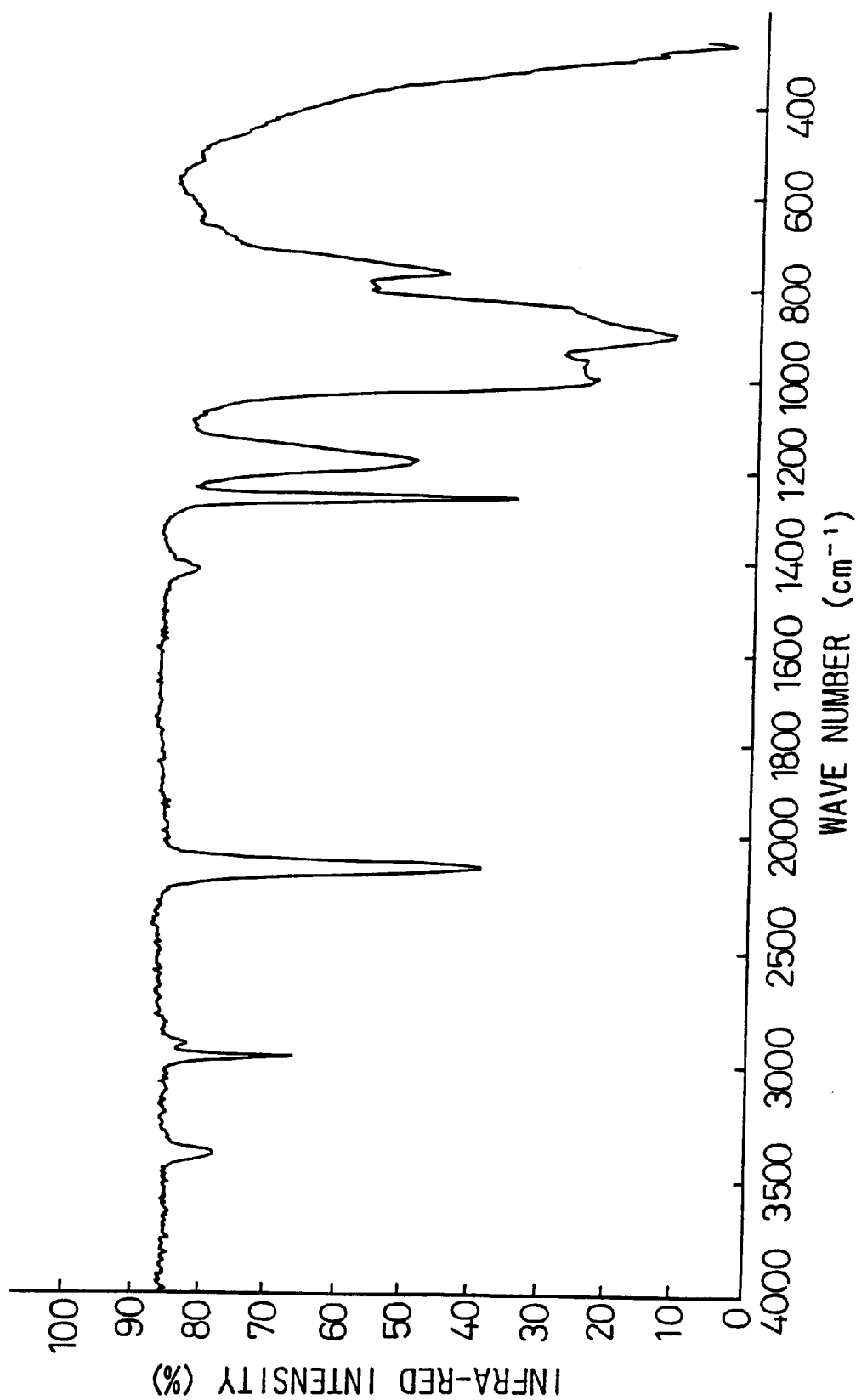
FIG. 5 is an IR spectrum for a perhydropolysilazane according to Reference Example 2.

A 100 mL four-necked flask was equipped with a gas-inlet tube, a thermometer, a condenser and a dropping funnel, and was flushed with argon gas. Then 12 ml of tetrahydrofuran and 0.189 g (4.71 mole) of potassium hydroxide were placed in the four-necked flask and magnetic stirring was commenced. 5.00 g of polymethyl(hydro)silazane and 50 ml of tetrahydrofuran were charged into the dropping funnel and these were dropped into potassium hydroxide. After reacting for 1 hour at room temperature, 1.60 g (11.3 mmole) of methane iodide and 1 ml of dry tetrahydrofuran were placed into the dropping funnel and dropped into the reaction solution. After reacting at room temperature for 3 hours, the solvent of the reaction mixture was removed under reduced pressure, 40 ml of dry n-hexane was added, separated centrifugally, and filtered. The solvent of the filtrate was removed under reduced pressure to provide 4.85 g of polymethyl(hydro)silazane as a white solid. The product had a number-average molecular weight of 1060. Its IR (Infrared) spectrum (solvent: dry o-xylene; concentration of polymethyl(hydro)silazane: 43.2 g/l) showed absorptions due to N—H at wavenumbers (cm$^{-1}$) 3380 and 1160; an absorption due to Si—H at 2120; and an absorption due to Si—$CH_3$ at 1255. The IR spectrum is shown in FIG. 5.

Comparative Example 1

The perhydropolysilazane prepared in reference example 1 was dissolved in xylene (20 wt %), and coated with a spin coater onto a silicon wafer having a diameter of 4 inches and a thickness of 0.5 mm (1000 rpm, 20 sec.), then dried at room temperature (30 min). At this stage, the IR spectrum was similar to that of perhydropolysilazane in FIG. 4. Subsequently, this perhydropolysilazane-coated silicon plate was immersed in pure water which had been heated to 90° C. for 3 hours.

As a result, the coating of perhydropolysilazane was came off.

Example 5

The perhydropolysilazanes prepared in reference example 1 were dissolved in xylene (20 wt %), and coated with a spin coater onto a silicon wafer having a diameter of 4 inches and a thickness of 0.5 mm (1000 rpm, 20 sec.), then dried at room temperature (30 min). At this stage, the IR spectrum was similar to that of perhydropolysilazane in FIG. 4. Subsequently, 0.050 g of palladium chloride (KOSO KAGAKU YAKUHIN K.K.) was dissolved in 1750 g of pure water with stirring and heated to 90° C. with a hot-plate. The silicon plate coated with the perhydropolysilazane was immersed in the aqueous solution of palladium chloride for 3 hours.

Figure 6:
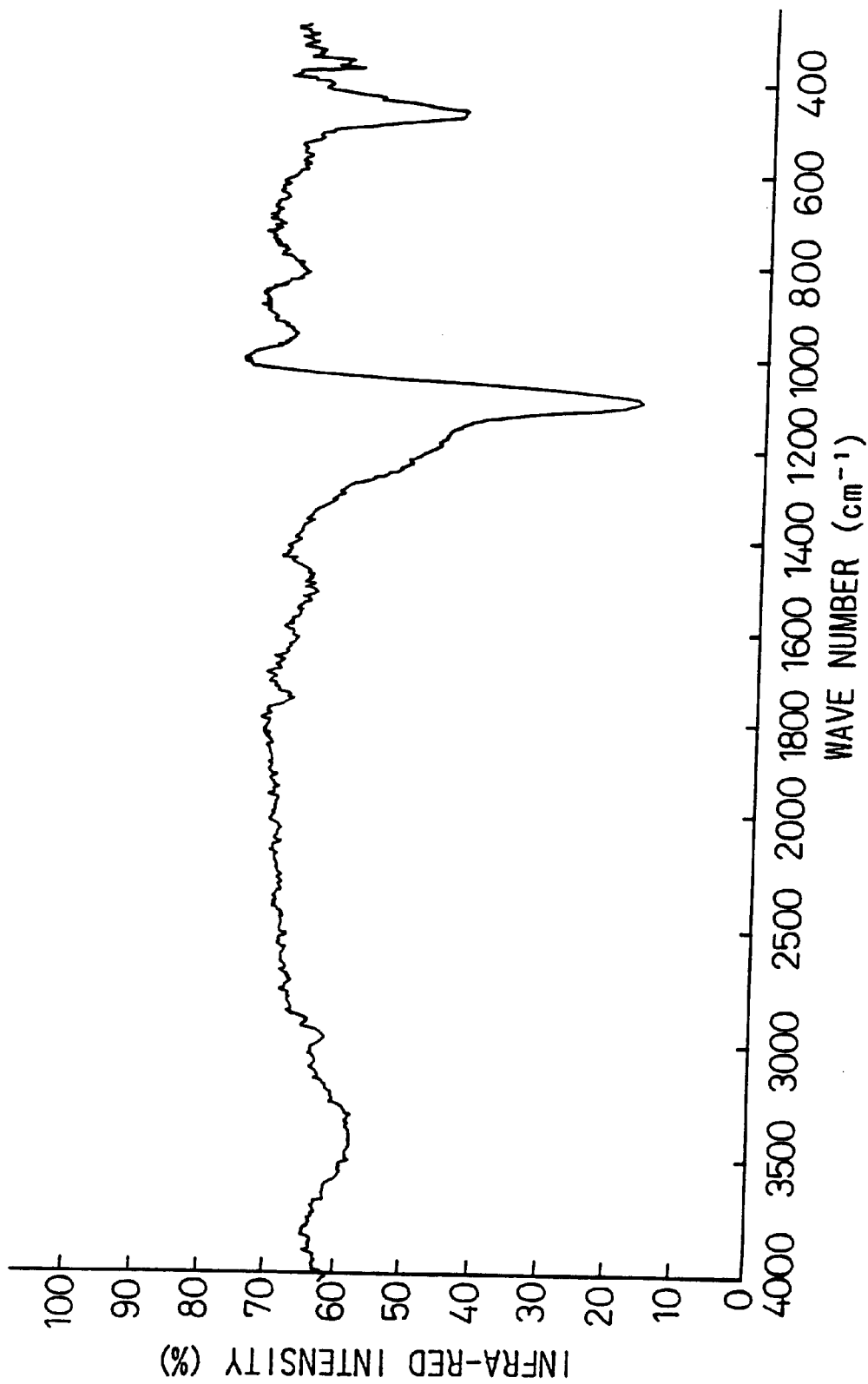
FIG. 6 is an IR spectrum for a polysilazane after being treated according to Example 4.

Then the polymer on the silicon plate was cured and at the same time black metal palladium was precipitated on the surface. The IR spectrum determined after the immersion is shown in FIG. 6. Absorption due to O—H at a wavenumber ($cm^{-1}$) of 3700 to 3300 and absorptions due to Si—O at 1160 and 450 were confirmed.

Example 6

The polymethyl(hydro)silazane prepared in reference example 2 was dissolved in xylene (20 wt %), and coated with a spin coater onto a silicon wafer having a diameter of 4 inches and a thickness of 0.5 mm (1000 rpm, 20 sec.), then dried at room temperature (30 min). At this stage, the IR spectrum was similar to that of polymethyl(hydro)silazane in FIG. 2. Subsequently, 0.050 g of palladium chloride (KOSO KAGAKU YAKUHIN K.K.) was dissolved in 1750 g of pure water with stirring and heated to 90° C. with a hot-plate. The silicon plate coated with the polymethyl (hydro)silazane was immersed in the aqueous solution of palladium chloride for 3 hours.

Figure 7:
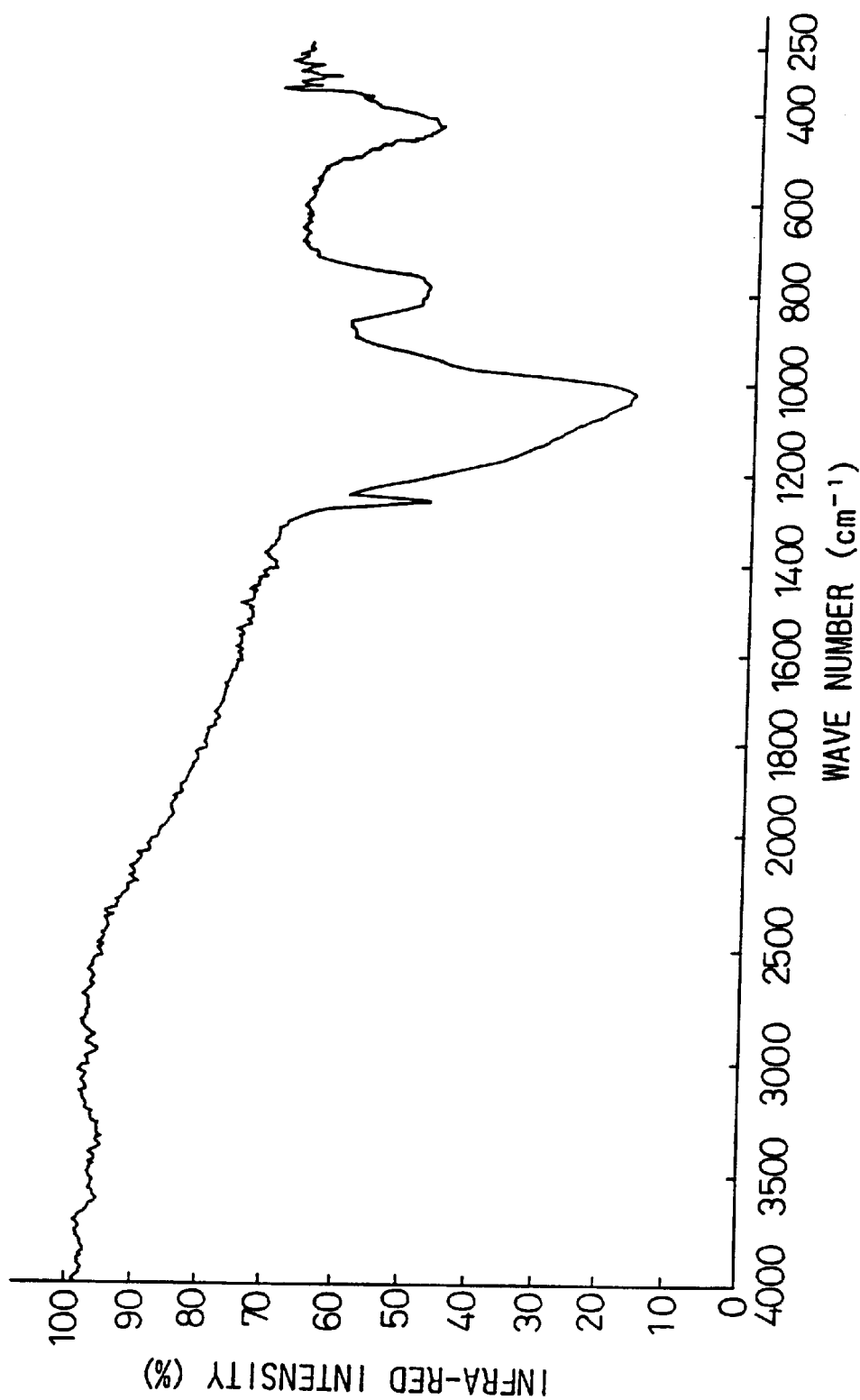
FIG. 7 is an IR spectrum for a polysilazane after being treated according to Example 5.

Then the polymer on the silicon plate was cured and at the same time black metal palladium was precipitated on the surface. The IR spectrum determined after the immersion is shown in FIG. 7. Absorption due to O—H at a wavenumber ($cm^{-1}$) of 3700 to 3300, absorptions due to Si—O at 1160 and 450, and an absorption due to Si—$CH_3$ at 1255 were confirmed.

Example 7

The perhydropolysilazanes prepared in reference example 1 were dissolved in a combined solvent of xylene and decalin (50%/50%) (20 wt %), and coated with a spin coater onto a silicon wafer having a diameter of 4 inches and a thickness of 0.5 mm (1000 rpm, 20 sec.), then dried at room temperature (30 min). At this stage, the IR spectrum was similar to that of perhydropolysilazane in FIG. 4. Subsequently, 0.063 g of palladium acetate (KOSO KAGAKU YAKUHIN K.K.) was dissolved in 1750 g of pure water with stirring and heated to 90° C. with a hot-plate. The silicon plate coated with the perhydropolysilazane was immersed in the aqueous solution of palladium acetate for 3 hours.

Figure 8:
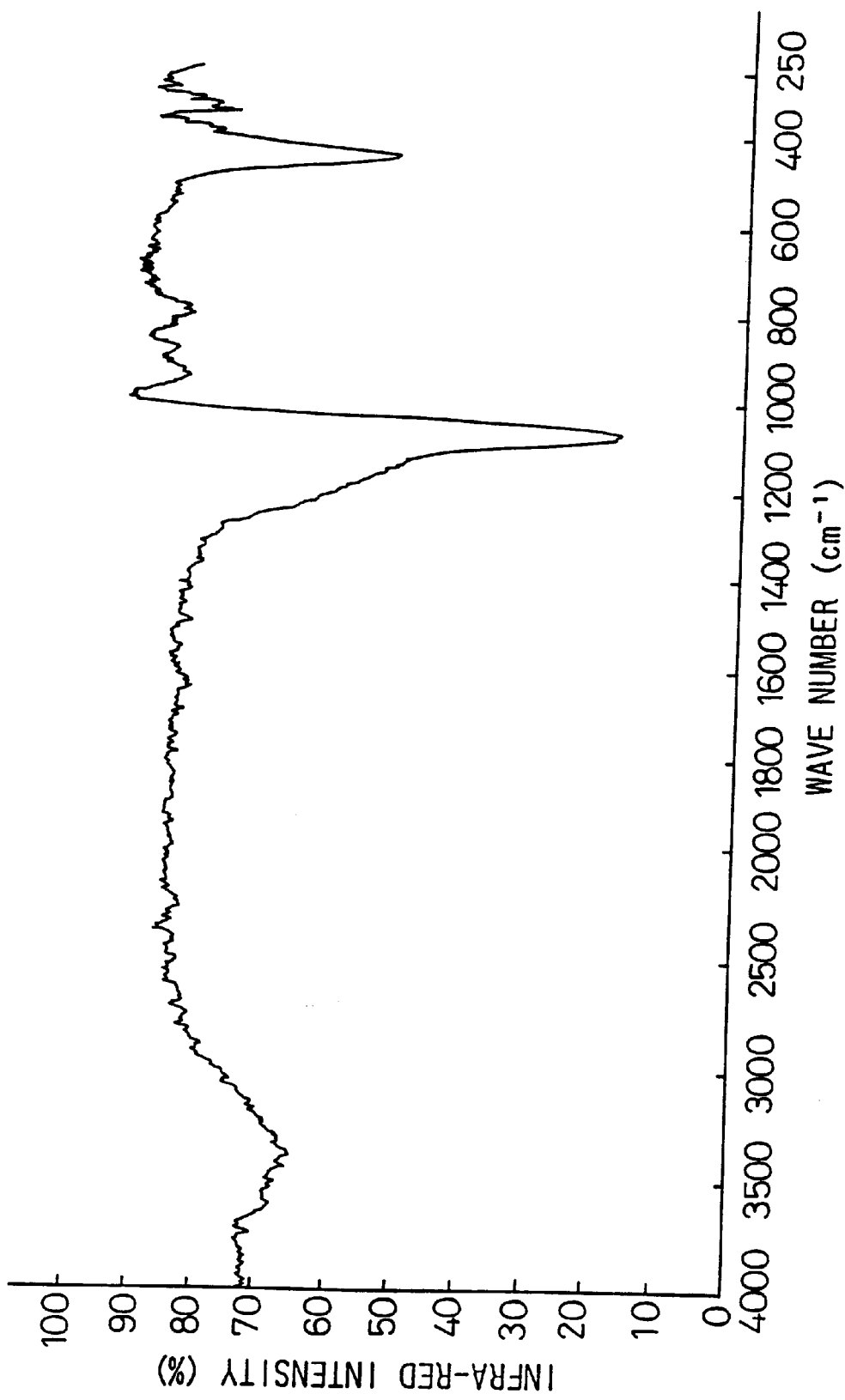
FIG. 8 is an IR spectrum for a polysilazane after being treated according to Example 6.
Figure 9:
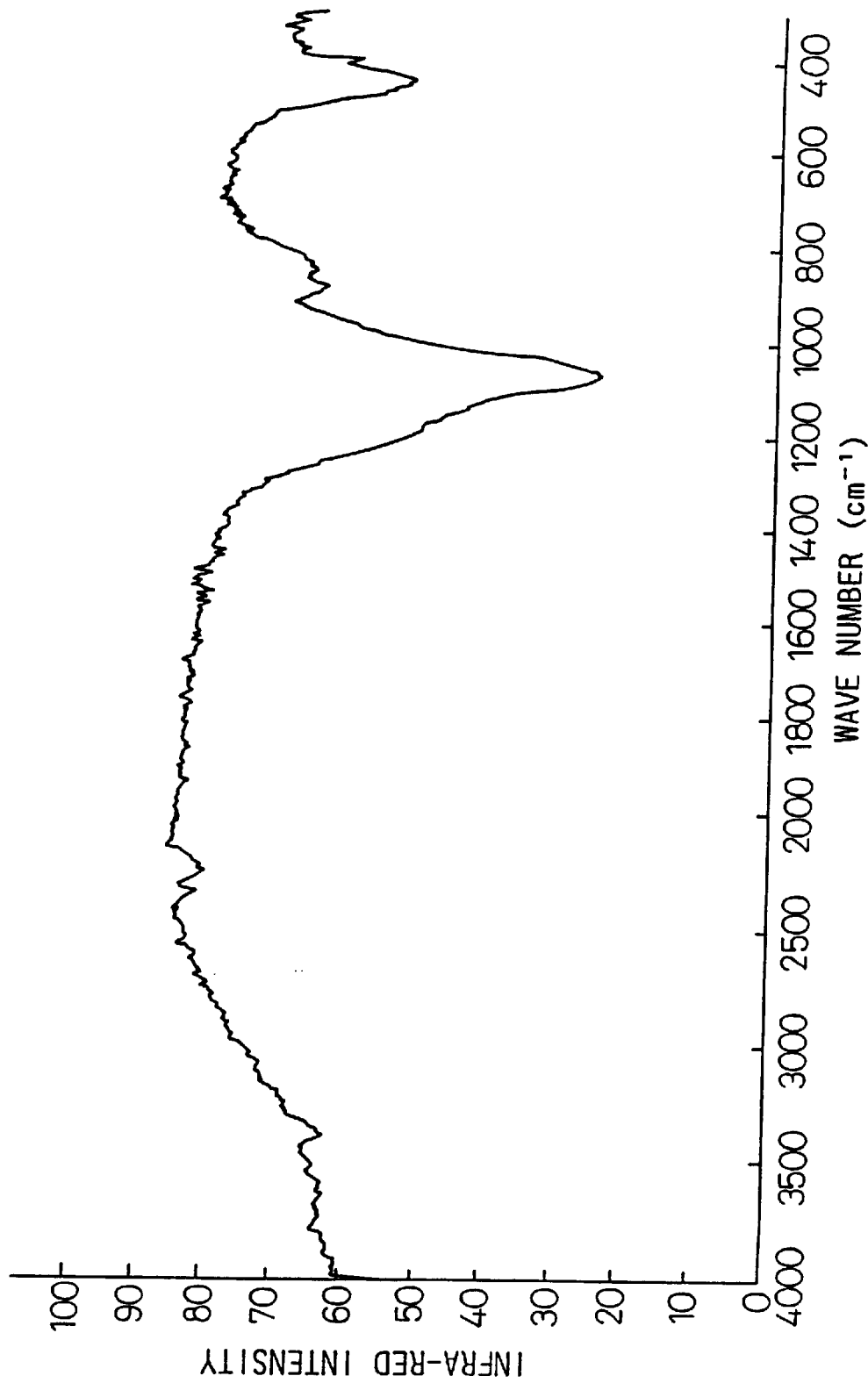
FIG. 9 is an IR spectrum for ceramics according to Example 16.

Then the polymer on the silicon plate was cured and at the same time black metal palladium was precipitated on the surface. The IR spectrum determined after the immersion is shown in FIG. 8. Absorption due to O—H at a wavenumber ($cm^{-1}$) of 3700 to 3300 and absorptions due to Si—O at 1160 and 450 were confirmed.

Example 8

The perhydropolysilazanes prepared in reference example 1 were dissolved in xylene (20 wt %), and coated with a spin coater onto a silicon wafer having a diameter of 4 inches and a thickness of 0.5 mm (1000 rpm, 20 sec.), then dried at room temperature (30 min). At this stage, the IR spectrum was similar to that of perhydropolysilazane in FIG. 4. Subsequently, 0.035 g of metal palladium (KOSO KAGAKU YAKUHIN K.K.) and 10 ml of 1N hydrochloric acid were added to 1750 g of pure water with stirring and heated to 90° C. with a hot-plate. The silicon plate coated with the perhydropolysilazane was immersed in the aqueous solution for 3 hours.

Then the polymer on the silicon plate was cured and at the same time black metal palladium was precipitated on the surface. Absorption due to O—H at a wavenumber ($cm^{-1}$) of 3700 to 3300 and absorptions due to Si—O at 1160 and 450 were confirmed.

Example 9

The perhydropolysilazanes prepared in reference example 1 were dissolved in xylene (20 wt %), and coated with a spin coater onto a silicon wafer having a diameter of 4 inches and a thickness of 0.5 mm (1000 rpm, 20 sec.), then dried at room temperature (30 min). At this stage, the IR spectrum was similar to that of perhydropolysilazane in FIG. 4. Subsequently, 0.050 g of palladium chloride (KOSO KAGAKU YAKUHIN K.K.) was dissolved in 1750 g of pure water with stirring. The silicon plate coated with the perhydropolysilazane was placed on a hot-plate heated at 90° C., and the aqueous solution of palladium chloride was sprayed onto the silicon plate with a spray. This operation was continued for 3 hours, then the polymer on the silicon plate was cured and at the same time black metal palladium was precipitated on the surface.

The IR spectrum was determined after the immersion. Absorption due to O—H at a wavenumber ($cm^{-1}$) of 3700 to 3300 and absorptions due to Si—O at 1160 and 450 were confirmed.

Example 10

The perhydropolysilazanes prepared in reference example 1 were extruded from a circular nozzle having a diameter of 0.10 mm while wound by a winder to produce a fibrous perhydropolysilazane having a diameter of 0.015 mm. Then 0.050 g of palladium chloride (KOSO KAGAKU YAKUHIN K.K.) was dissolved in 1750 g of pure water with stirring and heated to 90° C. with a hot-plate. The fibrous perhydropolysilazane was immersed in the aqueous solution of palladium chloride for 3 hours.

Then the polysilazane was cured and at the same time black metal palladium was precipitated on the surface. The IR spectrum after the immersion was determined, and absorption due to O—H at a wavenumber $cm^{-1}$) of 3700 to 3300 and absorptions due to Si—O at 1160 and 450 were confirmed.

Example 11

To 113.6 g of a solution containing 4.4% perhydropolysilazane Type-1 made by Tonen Corporation (PHPS-1; number-average molecular weight: 600 to 900) in pyridine was added 0.01 g of palladium acetate (made by MITSUWA KAGAKU YAKUHIN K.K.; purity>95%), and the reaction was carried out in a nitrogen gas atmosphere at 20° C. for 2 hours with stirring. The reaction solution was vacuumed to remove the solvent, then diluted with xylene to produce a 10% solution in xylene. This solution had a number-average molecular weight determined by GPC of 1174.

This solution was used as a coating solution, and coated with a spin coater onto a silicon wafer having a diameter of 4 inches and a thickness of 0.5 mm (1000 rpm, 20 sec.), and then heated in the ambient atmosphere at 350° C. for one hour to produce a coating having a thickness of 4168 Å.

The coating was evaluated by IR for its degree of conversion to ceramics, and was found to have 19.9% residual SiH, and have a SiO/SiN ratio of 2.9. Also, this coating was treated with a combined solution of 18 ml of 49% hydrofluoric acid (from DAIKIN KOGYO K.K.) and 1763 ml of 61% nitric acid (from KOSO CHEMICAL K.K.) and had an etching rate of 981 Å/min.

On the other hand, the coating liquid of the polysilazane without palladium acetate was coated and evaluated in a similar process, and was found to have 21% residual SiH, a SiO/SiN ratio of 1.1, and an etching rate of 2335 Å/min. (Refer to Table 1)

Example 12

To 20 g of a solution containing 20% perhydropolysilazane Type 1 made by Tonen Corporation (PHPS-1; number-average molecular weight: 600 to 900) in xylene was added 0.004 g of palladium acetate (made by MITSUWA KAGAKU YAKUHIN K.K.; purity>95%), and the reaction was carried out in an ambient atmosphere at 20° C. for 2 hours with stirring. The solution was diluted with xylene to give a 15% solution in xylene. This solution had a number average molecular weight determined by GPC of 1214.

This solution was used as a coating solution, and coated with a spin coater onto a silicon wafer having a diameter of 4 inches and a thickness of 0.5 mm (1000 rpm, 20 sec.), and then heated in the ambient atmosphere at 350° C. for one hour to produce a coating having a thickness of 638 Å.

The coating was evaluated by IR for its degree of conversion to ceramics, and was found to have 8.8% residual SiH, and a SiO/SiN ratio of 3.1.

Also, this coating was treated with a combined solution of 18 ml of 49% hydrofluoric acid (from DAIKIN KOGYO K.K.) and 1763 ml of 61% nitric acid (from KOSO CHEMICAL K.K.) and had an etching rate of 982 Å/min.

On the other hand, the coating liquid of the polysilazane without palladium acetate was coated and evaluated in a similar process, and was found to have 21% residual SiH, a SiO/SiN ratio of 1.1, and an etching rate of 2335 Å/min. (Refer to Table 1)

Example 13

To a combined solution of 20 g of a solution containing 10% perhydropolysilazane Type 1 made by Tonen Corporation (PHPS-1; number-average molecular weight is 600 to 800) in xylene and 10 g of pyridine was added 0.02 g of nickel acetate tetrahydrate (KANTO KAGAKU K.K.; special grade), and the reaction was carried out in the ambient atmosphere at 20° C. for 6 hours with stirring. This solution had a number average molecular weight determined by GPC of 1576.

This solution was used as a coating solution, and coated with a spin coater onto a silicon wafer having a diameter of 4 inches and a thickness of 0.5 mm (1000 rpm, 20 sec.), and then heated in the ambient atmosphere at 350° C. for one hour to produce a coating having a thickness of 5086 Å.

The coating was evaluated by IR for its degree of conversion to ceramics, and was found to have 13.0% residual SiH, and a SiO/SiN ratio of 2.3.

Also, this coating was treated with a combined solution of 18 ml of 49% hydrofluoric acid (from DAIKIN KOGYO K.K.) and 1763 ml of 61% nitric acid (from KOSO CHEMICAL K.K.) and had an etching rate of 1918 Å/min.

Example 14

To a combined solution of 20 g of a solution containing 10% of the perhydropolysilazane Type 1 made by Tonen Corporation (PHPS-1; number-average molecular weight: 600 to 800) in xylene and 10 g of pyridine was added 0.02 g of dirhodium tetraacetate (MITSUWA KAGAKU YAKUHIN K.K.), and the reaction was carried out in the ambient atmosphere at 20° C. for 6 hours with stirring. This solution had a number-average molecular weight determined by GPC of 1197.

This solution was used as a coating solution, and coated with a spin coater onto a silicon wafer having a diameter of 4 inches and a thickness of 0.5 mm (1000 rpm, 20 sec.), and then heated in the ambient atmosphere at 350° C. for one hour to produce a coating having a thickness of 3973 Å.

The coating was evaluated by IR for its degree of conversion to ceramics, and was found to have 16.9% residual SiH, and a SiO/SiN ratio of 1.9.

Also, this coating was treated with a combined solution of 18 ml of 49% hydrofluoric acid (from DAIKIN KOGYO K.K.) and 1763 ml of 61% nitric acid (from KOSO CHEMICAL K.K.) and had an etching rate of 1540 Å/min.

Example 15

To 10 g of a solution containing 20% perhydropolysilazane Type-1 made by Tonen Corporation (PHPS-1; number-average molecular weight: 900) in xylene was added 4 g of a solution containing 0.5% of palladium (II) propionate (made by N. E. Chemcat K.K.) in xylene. Additionally, 6 g of xylene was added to the solution, and the reaction was carried out in the ambient atmosphere at 20° C. for 3 hours with stirring. The solution was determined by GPC to have a number-average molecular weight of 961.

This solution was used as a coating solution, and coated with a spin coater onto a silicon wafer having a diameter of 4 inches and a thickness of 0.5 mm (1000 rpm, 20 sec.), and then heated in the ambient atmosphere at 350° C. for one hour to produce a coating having a thickness of 4161 Å.

The coating was evaluated by IR for its degree of conversion to ceramics, and was found to have 0% residual SiH and a SiO/SiN ratio of 16.2.

Also, this coating was treated with a combined solution of 18 ml of 49% hydrofluoric acid (from DAIKIN KOGYO K.K.) and 1763 ml of 61% nitric acid (from KOSO CHEMICAL K.K.) and had an etching rate of 938 Å/min.

TABLE 1

| | Amount added Metal carboxylate:Polysilazane (Ratio by weight) | Residual SiH (%) | Ratio of SiO/SiN | Etching rate (Å/min) |
|---|---|---|---|---|
| Example 11 (Reacted with Pd acetate) | 0.002 | 19.9 | 2.9 | 981 |
| (Unreacted) | — | 21 | 1.1 | 2335 |
| Example 12 (Reacted with Pd acetate) | 0.001 | 8.8 | 3.1 | 982 |

TABLE 1-continued

|  | Amount added Metal carboxylate:Polysilazane (Ratio by weight) | Residual SiH (%) | Ratio of SiO/SiN | Etching rate (Å/min) |
|---|---|---|---|---|
| Example 13 (Reacted with Ni acetate) | 0.1 | 13.0 | 2.3 | 1918 |
| Example 14 (Reacted with Rh acetate) | 0.1 | 16.9 | 1.9 | 1540 |
| Example 15 (Reacted with Pd propionate) | 0.04 | 0 | 16.2 | 938 |

*fired at 350° C. for 1 hr

Example 16

To 113.6 g of a solution containing 4.4% perhydropolysilazane Type-1 made by Tonen Corporation (PHPS-1; number average molecular weight: 600 to 900) in pyridinelene was added 0.05 g of palladium acetylacetonate (Strem Chemicals Inc.; purity 99%), and the reaction was carried out in a nitrogen gas atmosphere at 50° C. for 2 hours with stirring. The solution was subjected to reduced pressure to remove the solvent, then diluted with xylene to produce a 10% solution in xylene. This solution had a number-average molecular weight determined by GPC of 1267. The IR spectrum analysis showed absorptions due to CH at wavenumbers (cm$^{-1}$) of 2960 and 2940 after the reaction with palladium acetylacetonate. Further, by IHNMR spectrum (CDCl$_3$) analysis, an absorption at δ=1.4 was confirmed.

This solution was used as a coating solution, and coated with a spin coater onto a silicon wafer having a diameter of 4 inches and a thickness of 0.5 mm (1000 rpm, 20 sec.), and then heated in an ambient atmosphere at 350° C. for one hour to produce a coating having a thickness of 3132 Å.

The coating was evaluated by IR for its degree of conversion to ceramics, and was found to have 6% residual SiH and a SiO/SiN ratio of 6.1. Also, this coating was treated with a combined solution of 18 ml of 49% hydrofluoric acid (from DAIKIN KOGYO K.K.) and 1763 ml of 61% nitric acid (from KOSO CHEMICAL K.K.) and had an etching rate of 1078 Å/min.

Figure 10:
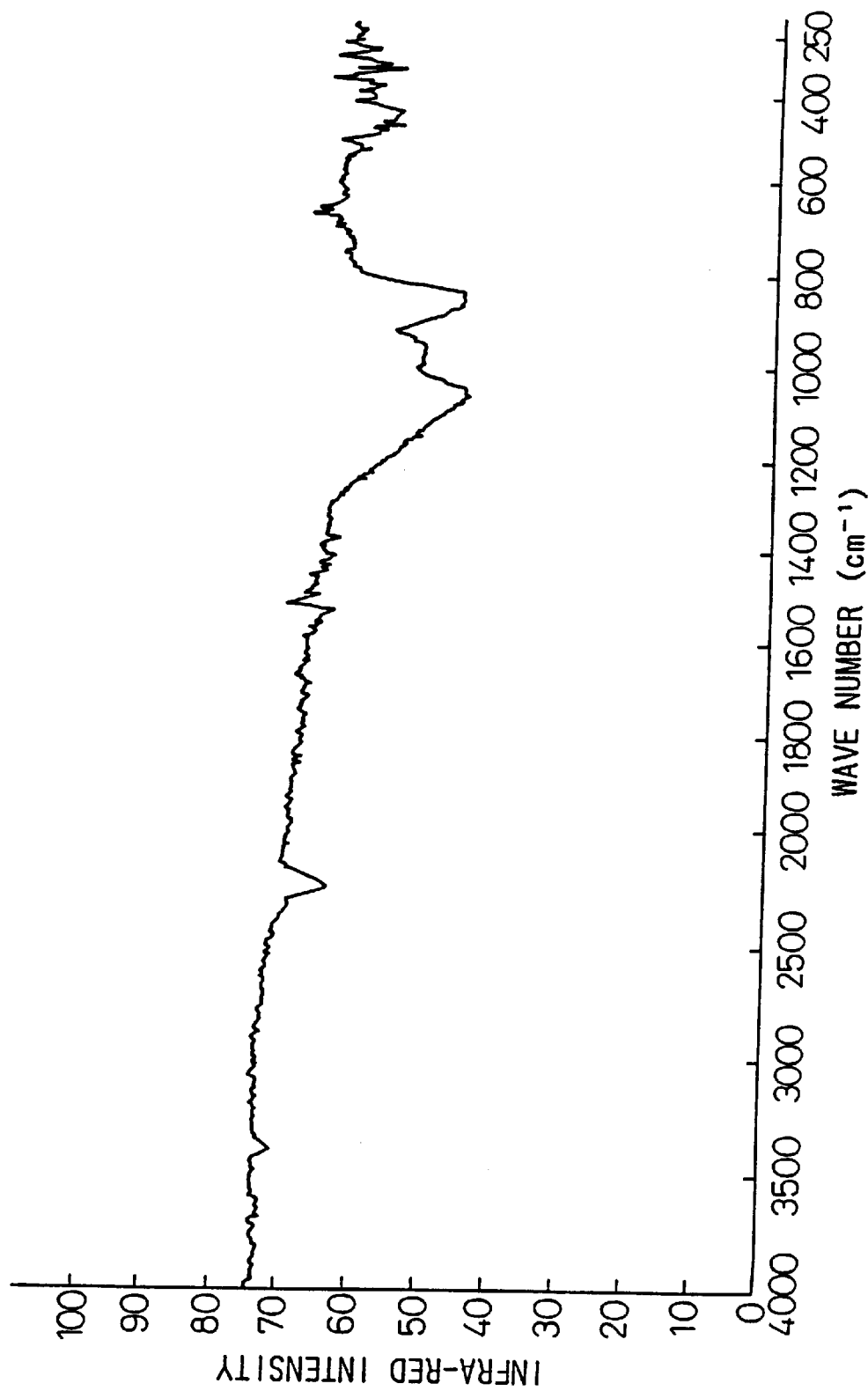
FIG. 10 is another IR spectrum for ceramics according to Example 16.

On the other hand, the coating liquid of the polysilazane without palladium acetylacetonate was coated and evaluated in a similar process, and was found to have 21% residual SiH, a SiO/SiN ratio of 1.1, and an etching rate of 2335 Å/min or more. (FIG. 10) (Refer to Table 2)

Example 17

Using platinum acetylacetonate, the same reaction, application, and evaluation were carried out as described in Example 1.

This solution had a number-average molecular weight of 1086. The IR spectrum analysis showed absorptions due to CH at wavenumbers (cm$^{-1}$) of 2960 and 2940 after the reaction with palladium acetylacetonate. Further, by $^1$HNMR spectrum (CDCl$_3$) analysis, an absorption at δ=1.4 was confirmed. The coating after heating had a thickness of 3435 Å, 6% residual SiH, a SiO/SiN ratio of 3.14 and an etching rate of 1290 Å/min. (Refer to Table 2)

Example 18

Using rhodium acetylacetonate, the same reaction, application, and evaluation were carried out as described in Example 16.

This solution had a number-average molecular weight of 901. The coating after heating had a thickness of 3963 Å, 2% residual SiH, a SiO/SiN ratio of 3.18 and an etching rate of 1086 Å/min. (Refer to Table 2)

TABLE 2

|  | Residual SiH (%) | Ratio of SiO/SiN | Etching rate (Å/min) | Metal in complex |
|---|---|---|---|---|
| Example 16 (Complex added) | 6 | 6.1 | 1078 | Palladium |
| Example 16 (No Complex added) | 21 | 1.1 | 2335 | None |
| Example 17 (Complex added) | 6 | 3.14 | 1290 | Platinum |
| Example 18 (Complex added) | 2 | 3.18 | 1086 | Rhodium |

*fired at 350° C. for 1 hr

Example 19

To 100 g of a solution containing 15 wt % perhydropolysilazane Type-1 made by Tonen Corporation (PHPS-1; number-average molecular weight: about 800) in xylene was added 0.75 g of a dispersion of super fine Ag particles (SINKU YAKIN K.K.; 10 wt % solution in α-terpineol; particle size=50 to 100 Å), and stirring was carried out at room temperature.

This solution was used as a coating solution, and coated with a spin coater onto a silicon wafer having a diameter of 4 inches and a thickness of 0.5 mm (1500 rpm, 20 sec.), and then heated in the ambient atmosphere at 350° C. (ramp rate=10° C./min) for one hour to produce a ceramic coating having a thickness of 5600 Å.

The coating was evaluated by IR for its degree of conversion to ceramics, and was found to have 0% residual SiH and a SiO/SiN ratio of 40.

As a control, a coating solution of a perhydropolysilazane without a dispersion of super fine Ag particles was applied and evaluated by the same process, and was found to have 10% residual SiH and a SiO/SiN ratio of 2.3.

Then, this fired coating was treated with a combined solution of 18 ml of 49% hydrofluoric acid (from DAIKIN KOGYO K.K.) and 1763 ml of 61% nitric acid (from KOSO CHEMICAL K.K.), and had an etching rate of 1057 Å/min for Example 19 and 2013 Å/min for the control.

SiO$_2$ Coated Articles (plastic films)

Example 20

To 10 g of a solution containing 20% perhydropolysilazane Type-1 made by Tonen Corporation (PHPS-1; number-average molecular weight: 900) in xylene was added 4 g of a solution containing 0.5% palladium (II) acetate (made by N. E. Chemcat K.K.) in xylene. Additionally, 6 g of xylene was added to the solution, and the reaction was carried out in the ambient atmosphere at 20° C. for 3 hours with stirring.

The solution was determined by GPC to have a number-average molecular weight of 961. This solution was used as a coating solution, and after filtering through a PTFE filter having a pore size of 0.1 μm, coated by dip coating onto both sides of a PET film having a thickness of 75 μm, and then heated in the ambient atmosphere at 150° C. for one hour.

A solution containing 1 wt % of hydrochloric acid in distilled water was prepared, and in which the heat-treated coating was immersed at room temperature for 3 hrs, and the coating was dried at room temperature. The coating had a thickness of about 1 μm. The coating was evaluated for its degree of conversion to ceramics by infrared spectroscopy (IR), and no absorption due to Si—H was observed. Also, absorption due to Si—OH at 940 cm$^{-1}$ and absorption due to O—H at 3400 cm$^{-1}$ were observed. The coating was determined by gravimetric analysis to have a density of 2.1 g/cml. The coating was determined by an ellipsometer to have a refractive index of 1.45. These values approximate to those of molten quartz glass (density=2.20 g/cm$^3$ and refractive index=1.46), therefore, it was confirmed that the resultant coating has a composition substantially equivalent to $SiO_2$. Also, the coating was determined by secondary ion mass spectrometry (SIMS) to have a nitrogen content of 0.57 atom %.

The thus prepared coated PET film was tested for gas permeability to oxygen and water vapor. For these measurements, a differential pressure type gas permeability measurement system GTR-30XD made by YANAGIMOTO SEISAKUSHO K.K. was used. Conditions for measuring permeability to oxygen include a measurement temperature of 25±1° C.; a test gas of dry oxygen (SUMITOMO SEIKA K.K.; ZERO-U Grade); a test gas pressure of 6.0 kgf/cm$^2$; a gas permeation area of 15.2 cm$^2$ (a diameter of 44 mm); three levels of storage time of permeation gas, of 33, 37 and 47 hrs. Conditions for measuring permeability to water vapor include a measurement temperature of 40±1° C.; a test gas of a combined gas of water vapor and dry oxygen; water vapor generation utilizing saturated water vapor at 23° C.; a test gas pressure of about 1 kgf/cm$^2$ [which includes a partial pressure of water vapor=2809.6 Pa≈0.0286 kgf/cm$^2$≈0.028 atm (saturated water vapor at 23° C.)]; a relative humidity of about 38% RH (determined by the ratio of measured temperature to saturated water vapor at the water vapor-generating temperature); a gas permeation area of 15.2 cm$^2$ (a diameter of 44 mm); three levels of storage time of permeation gas, of 33, 45 and 60 hrs. Measurements were done after a sufficient time had lapsed from the charge of the test gas into the samples at a predetermined pressure. Thus, the coated PET film was determined to have a permeability to oxygen of 0.09 cc/m$^2$·24 h·atm and a permeability to water vapor of 0.6 g/m$^2$·24 h.

The coated PET film had a pencil hardness of 2H.

The coated PET film, after being subjected to testing with steel wool No. 0000 for 100 cycles at 60 rpm under a load of 250 g, had no visible scratches.

Example 21

The solution used was the same as in Example 11, and after filtering through a PTFE filter having a pore size of 0.1 μm, it was coated by dip coating onto both sides of a PET film having a thickness of 75 μm, and then heated in the ambient atmosphere at 150° C. for one hour.

The heat treated coating was heated at 95° C. under atmospheric pressure at 80% RH (relative humidity) for 3 hrs. The coating had a thickness of about 1 μm. The coating was evaluated for its degree of conversion to ceramics by IR, and no absorption due to Si—H was observed. Absorption due to Si—OH at 940 cm$^{-1}$ and absorption due to O—H at 3400 cm$^{-1}$ were observed. The coating was determined by gravimetric analysis to have a density of 2.1 g/cm$^3$. The coating was determined by an ellipsometer to have a refractive index of 1.45. These values approximate to those of molten quartz glass (density=2.20 g/cm$^3$ and refractive index=1.46), therefore, it was confirmed that the resultant coating has a composition substantially equivalent to $SiO_2$. Also, the coating was determined by SIMS to have a nitrogen content of 1.3 atom %.

The thus prepared coated PET film was tested for gas permeability as in Example 11. The coated PET film was determined to have a permeability to oxygen at 25° C. of 0.1 cc/m$^2$·24 h·atm and permeability to water vapor at 40° C. of 1.0 g/m$^2$·24 h.

The coated PET film had a pencil hardness of 2H.

The coated PET film after being subjected to testing with steel wool No. 0000 for 100 cycles at 60 rpm under a load of 250 g had no visual scratches.

The data for gas barrier properties are summarized in the following Table 3, and the data for hardness in Table 4.

TABLE 3

Gas Barrier Properties

| | Permeability | |
|---|---|---|
| | to water vapor g/m$^2$ · 24h | to oxygen cc/m$^2$ · 24 h · atm |
| PET film base | 8.0 | 25.0 |
| Example 20 | 0.6 | 0.09 |
| Example 21 | 1.0 | 0.1 |

TABLE 4

Hardness

| | Pencil Hardness | #0000 steel wool |
|---|---|---|
| PET film base | 3B | scratches present |
| Example 20 | 2H | no scratches |
| Example 21 | 2H | no scratches |

A $SiO_2$ Coated Article (UV-blocking transparent plate)

In the following examples, a haze-meter NDH-300A (NIHON DENSHOKU K.K.) was used for the measurements of the haze, and a Taber abrader AB-101 (TESTER SANGYO K.K.) was used for the Taber abrasion test.

Preparation of the Polysilazane Coating Compositions Composition 1:

20% perhydropolysilazane Type-1 made by Tonen Corporation (PHPS-1; number-average molecular weight is 900) in xylene was prepared, and referred to as Composition 1.

Composition 2:

A 1 L reactor provided in a reacting bath at 0° C. was flushed with a dry nitrogen gas, and then 500 ml of dry pyridine was charged into the reactor and kept until the temperature became constant. Subsequently, 50.5 g of dichlorosilane ($SiH_2Cl_2$) and 28.75 g of methyldichlorosilane (MeSiHCl) were added with stirring to form a complex mixture to give a white solid adduct.

Next, 32.0 g of dry ammonia was added over about 30 minutes while stirring the reaction mixture. On completion of the reaction, a dry nitrogen gas was blown into the mixture to remove unreacted ammonia. The mixture was then filtered under pressure in a nitrogen gas atmosphere to give 450 ml of a filtrate. 1000 ml of dry m-xylene was added to the filtrate and the solvent was removed under reduced pressure to give 31.0 g of a colorless viscous liquid.

The viscous liquid was determined by GPC to have a number-average molecular weight of 1500. IR spectrum analysis confirmed the absorptions due to N—H at 3350 $cm^{-1}$ and 1175 $cm^{-1}$, absorption due to Si—H at 2165 $cm^{-1}$, absorptions due to Si—H and Si—N—Si at from 1020 $cm^{-1}$ to 820 $cm^{-1}$, and absorption due to Si—Me at 1270 $cm^{-1}$.

A solution containing 20% of this viscous liquid in xylene was prepared and referred to as Composition 2.

Composition 3:

To 50 g of the 20% xylene solution of Composition 1 was added 20 g of a solution containing 0.5% of palladium acetate in xylene, and the reaction was carried out in the ambient atmosphere at 20° C. for 3 hrs with stirring.

Next, the solution was concentrated to prepare a solution having a concentration of 20%. The solution was determined by GPC to have a number-average molecular weight of 970. This solution was referred to as Composition 3.

Composition 4:

To 50 g of the 20% xylene solution of Composition 2 was added 20 g of a solution containing 0.5% of palladium acetate in xylene, and the reaction was carried out in the ambient atmosphere at 20° C. for 3 hrs with stirring.

Next, the solution was concentrated to prepare a solution having a concentration of 20%. The solution was determined by GPC to have a number-average molecular weight of 1550. This solution was referred to as Composition 4.

Example 22

To 50 g of the 20% xylene solution of Composition 3 was added 116.6 g of a dispersion containing 20% of fine zinc oxide particles (SUMITOMO CEMENT K.K.) in toluene, and the solution was stirred at room temperature for one hour. At this state, the amount of zinc oxide was 70% by weight of the total solids of the polymer and the fine zinc oxide particles.

The dispersion of zinc oxide was coated by spin coating (2000 rpm, 20 sec) onto quartz glass. After coating, it was fired in the ambient atmosphere at 250° C. for 30 minutes. The fired coating was colorless and transparent, and had a thickness of 1.2 $\mu$m.

The UV-visible spectrum of this coating showed a transmittance at 370 nm of 8.0% and a transmittance at 350 nm of 2.2%, indicating its superior UV-absorbing effect. The haze was determined to be 0.2%, also indicating its superior optical properties. The coating had a pencil hardness of 9H or higher.

Example 23

To 50 g of the xylene solution of Composition 4 was added 116.6 g of a dispersion containing 20% of fine zinc oxide particles (SUMITOMO CEMENT K.K.) in toluene, and the solution was stirred at room temperature for one hour. At this state, the amount of zinc oxide was 70% by weight of the total solids of the polymer and the fine zinc oxide particles.

The dispersion of zinc oxide was coated by spin coating (2000 rpm, 20 sec) onto quartz glass. After coating, it was fired in the ambient atmosphere at 250° C. for 30 minutes. The fired coating was colorless and transparent, and had a thickness of 1.2 $\mu$m.

The UV-visible spectrum of this coating showed a transmittance at 370 nm of 7.6% and a transmittance at 350 nm of 1.6%, indicating its superior UV-absorbing effect. The haze was determined to be 0.2%, also indicating its superior optical properties. The coating had a pencil hardness of 7H or higher.

Example 24

To the 20% xylene solution of Composition 3 was added a dispersion containing the fine zinc oxide particles in toluene such that the concentration of zinc oxide in the solids was 70% by weight as in Example 22. The dispersion was coated by spin coating (2000 rpm, 20 sec) onto quartz glass, then fired at 250° C. for 120 minutes.

Subsequently, onto the UV-absorbing coating was overcoated Composition 1 which had been adjusted to have a concentration of 10% by spin coating (2000 rpm, 20 sec), then fired at 250° C. for 120 minutes, in order to protect the zinc oxide.

The resultant coating was colorless and transparent, and had a combined thickness with the UV-absorbing coating of 1.5 $\mu$m.

This coating had the following optical properties:

UV-absorbing properties: T370=8%, T350=2.1%

Transmittance to visible light: 92%

Percent haze: 0.2%

The following are the optical properties after immersing the coating in 5% hydrochloric acid for 24 hours.

UV-absorbing properties: T370=8%, T350=2.1%

Transmittance to visible light: 91%

Percent haze: 0.2%

Thus, the coating showed no change in the optical properties before and after immersion in hydrochloric acid, indicating its superior resistance to acids.

The physical strength of the coating was tested by the Taber text (500 g, 1000 cycles), and percent hazes before and after the test were compared. It was confirmed that the resultant percent haze of 0.5% was within the acceptable values as a transparent plate.

Example 25

To the 20% xylene solution of Composition 4 was added a dispersion containing the fine zinc oxide particles in toluene such that the concentration of zinc oxide in the solids was 70% by weight as in Example 22. The dispersion was coated by flow coating onto soda glass, then fired at 250° C. for 120 minutes.

Subsequently, onto the UV-absorbing coating was overcoated the 20% solution of Composition 4 by flow coating, then fired at 250° C. for 120 minutes, in order to protect the zinc oxide.

The resultant protective coating was colorless and transparent, and had a combined thickness with the UV-absorbing coating of 4 $\mu$m.

This coating had the following optical properties:

UV-absorbing properties: T370=2.0%, T350=0.2%

Transmittance to visible light: 90%

Percent haze: 0.2%

The coating was then immersed in 5% hydrochloric acid for 24 hours, and showed no change in optical properties before and after the immersion, indicating its superior resistance to acids.

As in Example 24, the coating was subjected to the Taber test (500 g, 1000 cycles), and percent hazes before and after the test were compared. It was confirmed that the resultant percentage of haze of 1.5% was within the acceptable values as a transparent plate.

Example 26

To the 20% xylene solution of Composition 3 was added a dispersion containing the fine zinc oxide particles in toluene such that the concentration of zinc oxide in the solids was 70% by weight as in Example 22. The dispersion was coated by flow coating onto a polycarbonate substrate, then fired at 130° C. for 1 hour.

Subsequently, the coating was treated in a humid atmosphere having a relative humidity of 80% at 95° C. for 3 hrs.

The resultant protective coating was colorless and transparent, and had a thickness of 0.8 μm.

This coating had the following optical properties:

UV-absorbing properties: T370=15%, T350=5%

Transmittance to visible light: 88%

Percent haze: 0.2%

These values are superior as a transparent plastic plate.

The coating had a pencil hardness of 7H, indicating that it has sufficient hardness as a plastic.

According to the present invention, by using polysilazanes and ultraviolet ray-absorbing fine metal oxide particles, a UV-blocking ceramic coating having high transparency may be formed on a transparent plate such as a plastic or glass with a simple and convenient method such as a coating method and without exposing these plates to heat treatment using a high temperature which would be detrimental to these transparent plates.

According to the present invention, a method is provided for forming dense ceramics, particularly a ceramic coating at a low temperature of 150° C. or lower, even 100° C. or lower. Therefore, the cost for the firing utilities may be reduced. Additionally, a ceramic coating can be applied to a substrate which could not have been ceramic coated until now due to the firing temperature (plastics, electronical parts, and the like). The SiO$_2$-coated plastic films according to the present invention have gas barrier properties and a resistance to abrasion, therefore, are particularly useful as a packaging film for foods, medicaments, and the like, as a protective film for a touch panel of a liquid crystal display, and as a film base for a film liquid crystal.

We claim:

1. A method for forming ceramics characterized in that a polysilazane having a number-average molecular weight of 100 to 50,000 or a modified polysilazane thereof is subjected to a drying treatment at room temperature or a heat treatment in the ambient atmosphere or an inert gas atmosphere, then exposed to an atmosphere containing water vapor or immersed in distilled water containing a catalyst, or both, said polysilazane having a skeleton comprising the unit represented by the following general formula (I):

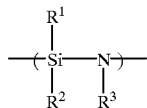 (I)

wherein $R^1$, $R^2$ and $R^3$ each independently represents a hydrogen atom, an alkyl group, an alkenyl group, a cycloalkyl group, an aryl group, a group other than the above and having a carbon atom directly attached to the silicon atom, an alkylsilyl group, an alkylamino group and an alkoxy group; with the proviso that at least one of $R^1$, $R^2$ and $R^3$ is a hydrogen atom.

2. A method according to claim 1, wherein said modified polysilazane is a polysilazane to which an additive is added.

3. A method according to claim 1, wherein said modified polysilazane is a silicon alkoxide-added polysilazane having an atomic ratio of silicon derived from the alkoxide to silicon derived from a polysilazane ranging from 0.001 to 3 and a number-average molecular weight of about 200 to 500,000, obtained by reacting the polysilazane of the above formula (I) with a silicon alkoxide represented by the following formula (II) with heating:

 (II)

wherein $R^4$ represents, which may be the same or different, a hydrogen atom, an alkyl or aryl group having 1 to 20 carbon atoms, with the proviso that at least one $R^4$ is the alkyl or aryl group.

4. A method according to claim 1, wherein said modified polysilazane is a glycidol-added polysilazane having a weight ratio of glycidol to a polysilazane ranging from 0.001 to 2 and a number-average molecular weight of about 200 to 500,000, obtained by reacting the polysilazane of the above formula (I) with glycidol.

5. A method according to claim 1, wherein said modified polysilazane is an alcohol-added polysilazane having a weight ratio of the alcohol to a polysilazane ranging from 0.001 to 2 and a number-average molecular weight of about 100 to 500,000, obtained by reacting the polysilazane of the above formula (I) with an alcohol.

6. A method according to claim 1, wherein said modified polysilazane is a metal carboxylate-added polysilazane having a weight ratio of a metal carboxylate to a polysilazane ranging from 0.000001 to 2 and a number-average molecular weight of about 200 to 500,000, obtained by reacting the polysilazane of the above formula (I) with a metal carboxylate containing at least one metal selected from the group consisting of nickel, titanium, platinum, rhodium, cobalt, iron, ruthenium, osmium, palladium, iridium and aluminum.

7. A method according to claim 1, wherein said modified polysilazane is an acetylacetonato complex-added polysilazane having a weight ratio of an acetylacetonato complex to a polysilazane ranging from 0.000001 to 2 and a number-average molecular weight of about 200 to 500,000, obtained by reacting the polysilazane of the above formula (I) with an acetylacetonato complex containing as a metal nickel, platinum, palladium or aluminum.

8. A method according to claim 1, wherein said modified polysilazane is a polysilazane obtained by adding fine particles of at least one metal selected from the group consisting of Au, Ag, Pd and Ni to a coating solution containing as a major component the polysilazane of the above formula (I).

9. A method according to claim 1, wherein said heat treatment is carried out at a temperature of 150° C. or below.

10. A method according to claim 1, wherein said atmosphere containing water vapor is an atmosphere containing saturated water vapor under pressure.

11. A method according to claim 1, wherein said catalyst is hydrochloric acid.

12. A method according to claim 1, wherein said catalyst is 1,8-diazabicyclo-[5.4.0]-7-undecene.

13. A method according to claim 1, wherein the content of said catalyst is from 1 to 10% by weight.

14. A method for forming ceramics wherein a polysilazane having a number-average molecular weight of 100 to 50,000 is brought into contact with $Pd^{2+}$ ions and water, said polysilazane having a skeleton comprising the unit represented by the following general formula (I):

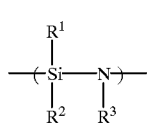

(I)

wherein

R$^1$, R$^2$ and R$^3$ each independently represents a hydrogen atom, an alkyl group, an alkenyl group, a cycloalkyl group, an aryl group, a group other than the above and having a carbon atom directly attached to the silicon atom, an alkylsilyl group, an alkylamino group and an alkoxy group; with the proviso that at least one of R$^1$, R$^2$ and R$^3$ is a hydrogen atom.

15. A method according to claim 14, wherein said $Pd^{2+}$ ions are provided by dissolving in water a palladium compound selected from the group consisting of palladium acetate, palladium acetylacetonate, palladium chloride, palladium hydroxide, palladium iodide, palladium nitrate and palladium oxide.

16. A method according to claim 14, wherein said $Pd^{2+}$ ions are provided by dissolving metal palladium in an aqueous acid solution.

17. A method according to claim 14, wherein said water is provided by immersing the polysilazane in water.

18. A method according to claim 14, wherein said water is provided by spraying water onto the polysilazane.

19. A method according to claim 14, wherein said contact is carried out at a temperature of 100° C. or below.

20. A method for forming ceramics wherein a modified polysilazane having a number-average molecular weight of 100 to 500,000 is subjected to a heat treatment at a temperature of 400° C. or below in the ambient atmosphere or an inert gas atmosphere, said polysilazane having a skeleton comprising the unit represented by the following general formula (I):

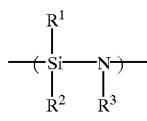

(I)

wherein

R$^1$, R$^2$ and R$^3$ each independently represents a hydrogen atom, an alkyl group, an alkenyl group, a cycloalkyl group, an aryl group, a group other than the above and having a carbon atom directly attached to the silicon atom, an alkylsilyl group, an alkylamino group and an alkoxy group; with the proviso that at least one of R$^1$, R$^2$ and R$^3$ is a hydrogen atom.

21. A method according to claim 20, wherein said modified polysilazane is a metal carboxylate-added polysilazane having a weight ratio of a metal carboxylate to a polysilazane ranging from 0.000001 to 2 and a number-average molecular weight of about 200 to 500,000, obtained by reacting the polysilazane of the above formula (I) with a metal carboxylate containing at least one metal selected from the group consisting of nickel, titanium, platinum, rhodium, cobalt, iron, ruthenium, osmium, palladium, iridium and aluminum.

22. A method according to claim 20, wherein said modified polysilazane is an acetylacetonato complex-added polysilazane having a weight ratio of an acetylacetonato complex to a polysilazane ranging from 0.000001 to 2 and a number-average molecular weight of about 200 to 500,000, obtained by reacting the polysilazane of the above formula (I) with an acetylacetonato complex containing as a metal nickel, platinum, palladium or aluminum.

23. A method according to claim 20, wherein said modified polysilazane is a polysilazane obtained by adding fine particles of at least one metal selected from the group consisting of Au, Ag, Pd and Ni to a coating solution containing as a major component the polysilazane of the above formula (I).

24. A method according to claim 1, wherein an ultraviolet absorber is added to said polysilazane or the modified polysilazane thereof.

25. A method according to claim 24, wherein said ultraviolet absorber is $TiO_2$ or ZnO.

26. A method according to claim 3, wherein an ultraviolet absorber is added to said polysilazane or the modified polysilazane thereof.

27. A method according to claim 7, wherein an ultraviolet absorber is added to said polysilazane or the modified polysilazane thereof.

28. A method according to claim 14, wherein an ultraviolet absorber is added to said polysilazane or the modified polysilazane thereof.

29. A method according to claim 20, wherein an ultraviolet absorber is added to said polysilazane or the modified polysilazane thereof.

* * * * *